(12) United States Patent
Fujiwara et al.

(10) Patent No.: US 6,472,470 B1
(45) Date of Patent: Oct. 29, 2002

(54) VINYL ALCOHOL POLYMER AND ITS COMPOSITION

(75) Inventors: Naoki Fujiwara, Kurashiki (JP); Kazuyuki Somemiya, Kurashiki (JP); Takeshi Kusudou, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/452,189

(22) Filed: Dec. 2, 1999

(30) Foreign Application Priority Data

Dec. 9, 1998 (JP) .................................... 10-350144

(51) Int. Cl.⁷ .............................. C08F 8/12; C08F 8/16; C08F 8/00
(52) U.S. Cl. ........................... 525/61; 524/557; 525/57; 525/60
(58) Field of Search .............................. 525/60, 61, 57; 524/557

(56) References Cited

U.S. PATENT DOCUMENTS

| | | | |
|---|---|---|---|
| 3,218,284 A | | 11/1965 | Gardner |
| 4,104,453 A | | 8/1978 | Broering et al. |
| 4,719,259 A | | 1/1988 | Jenkins |
| 4,931,500 A | | 6/1990 | Okamoto et al. |
| 5,032,632 A | | 7/1991 | Saxton |
| 5,057,390 A | * | 10/1991 | Sato et al. .................. 430/281 |
| 5,349,023 A | * | 9/1994 | Ikeda et al. .................. 525/61 |
| 5,599,870 A | | 2/1997 | Nakamae et al. |
| 5,710,211 A | | 1/1998 | Sato et al. |
| 5,712,334 A | * | 1/1998 | Watanabe et al. ........... 524/161 |
| 5,866,655 A | | 2/1999 | Fujiwara et al. |
| 5,885,720 A | | 3/1999 | Fujiwara et al. |

FOREIGN PATENT DOCUMENTS

| | | |
|---|---|---|
| EP | 0 363 813 | 4/1990 |
| EP | 0 386 720 | 9/1990 |
| EP | 0 569 699 | 11/1993 |
| EP | 0 837 078 | 4/1998 |
| FR | 2 593 508 | 7/1987 |
| FR | 2 621 320 | 4/1989 |
| GB | 1190018 | 4/1970 |
| JP | 62-229135 | 10/1987 |
| JP | 63-289581 | 11/1988 |
| JP | 4-10885 | 2/1992 |
| JP | 5-49683 | 7/1993 |
| JP | 7-228625 | 8/1995 |
| JP | 9-241999 | 9/1997 |
| WO | WO 90/08806 | 8/1990 |

\* cited by examiner

*Primary Examiner*—Judy M. Reddick
(74) *Attorney, Agent, or Firm*—Oblon, Spivak, McClelland, Maier & Neustadt, P.C.

(57) ABSTRACT

Vinyl alcohol polymers having an ethylene unit content of 2 to 19 mole %, a polymerization degree of 200 to 2,000, a degree of saponification of 80 to 99.99 mole % and a total content of carboxyl group and lactone rings of 0.02 to 0.4 mole % are excellent in thermal stability, water resistance, gas-barrier properties, water vapor-barrier property, stability of aqueous solution kept at low temperatures and biodegradability.

16 Claims, No Drawings

VINYL ALCOHOL POLYMER AND ITS COMPOSITION

BACKGROUND OF THE INVENTION

1. Field of the Invention

The present invention relates to vinyl alcohol polymers and compositions thereof. More specifically, the present invention relates to vinyl alcohol polymers having good thermal stability, water resistance, gas-barrier properties, water vapor-barrier property, aqueous solution stability when kept at low temperatures, and biodegradability.

2. Description of the Prior Art

Polyvinyl alcohol (hereinafter sometimes referred to as "PVA"), being one of a few crystalline, water soluble polymers, has excellent film formability, transparency, strength properties and interfacial activity. The polymer has therefore been widely used as a paper modifying agent such as coating agent for paper or additive for paper manufacturing process, an adhesive for paper, wood, inorganic materials and the like, a sizing agent for filling, a stabilizer for emulsion polymerization and suspension polymerization and as various binders. Furthermore, polyvinyl alcohol is important as a raw material for films, sheets and the like made of polyvinyl alcohol.

"Completely saponified PVA" having a degree of saponification of about 98 mole % and "partially saponified PVA" having one of about 88 mole % are known as conventional PVAs. In addition, development of high-performance PVAs by introduction of some functional groups to improve specific properties has been performed and, as a result, various modified polyvinyl alcohols are available.

Conventional PVAs, having not so high thermal stability, have been used in the form of aqueous solutions. That is, "completely saponified PVA" is not melt moldable because its melting point and thermal decomposition temperature are very close to each other. On the other hand, "partially saponified PVA", which has a melting point lower than that of "completely saponified PVA", has low thermal stability and hence has the problem of generating acetic acid odor on melt molding.

There has been proposed blending a plasticizer or other polymers with PVA to decrease the melt viscosity of the PVA, thereby rendering the resulting PVA to become melt moldable. However, with the molded articles obtained after addition of a plasticizer, the content of the plasticizer decreases with time, when they are used over a long period of time. Then, under low-temperature and low-humidity conditions such as in the winter season, the molded articles become insufficient flexibility and tend to suffer from generation of splits or cracks. Also, blending of other polymers with PVA tends, due to poor compatibility between the blended polymers, to markedly decrease the mechanical properties or transparency of the molded articles.

Modification of PVA to decrease its melting point has also been proposed.

Thus, Japanese Patent Publication Nos. 10885/1992 and 49683/1993 proposed, respectively, a PVA having units from a ω-hydroxyalkyl vinyl ether and those from an alkyl vinyl ether and a PVA having units from a polyoxyethylene monoallyl ether. These modified PVAs however suffered from poor thermal stability. Japanese Patent Application Laid-open No. 229135/1987 proposed a PVA having allyl alcohol units, which was improved in thermal stability to some extent but insufficiently for practical purposes and, moreover, had the problem of safety of the allyl alcohol remaining in the PVA. Japanese Patent Application Laid-open No. 289581/1988 proposed a PVA having units from an α-olefin, which tended to suffer from a marked increase in the melt viscosity due to association of the hydrophobic groups and further had the problem of being insoluble in water. Japanese Patent Application Laid-open No. 228625/1995 proposed a PVA having on the side chains thereof a hydroxyalkyl group with specific number of carbon atoms, which was improved in thermal stability to some extent but insufficiently for practical purposes.

PVAs also have the advantages of having excellent gas-barrier properties and transparency and causing little waste treatment problems, so that films utilizing "completely saponified PVA" are sometimes used as gas-barrier layers. However, it is known that although PVA films have high gas-barrier properties at low moisture absorption, i.e. under dry atmosphere, they strongly absorb moisture to become of low gas-barrier properties under a relative humidity of about 70% or more. In order to decrease the moisture absorbing tendency of PVA, there has been used ethylene-vinyl alcohol copolymer (hereinafter referred to as "EVOH") having copolymerized at least 20 mole % of ethylene. EVOH however is insoluble in water, so that for use in the form of solution it should be dissolved in an organic solvent, which markedly worsen the work environment. There have also been proposed, in order to decrease the moisture absorbing tendency of PVA, use of modified PVAs having crosslinking property, use of PVA reacted with a coupling agent, and use of PVA reacted with another polymer to introduce crosslinking structure. However, these modified PVAs have still insufficient gas-barrier properties under high-moisture conditions perhaps due to formation of pores on crosskinking.

SUMMARY OF THE INVENTION

Accordingly, an object of the present invention is to provide a vinyl alcohol polymer which can solve all the inherent problems of conventional PVAs and thus has excellent thermal stability, water resistance, gas-barrier properties and, when it is used in the form of aqueous solution, has good stability when the aqueous solution is allowed to stand for a long time at low temperatures.

Another object of the present invention is to provide a vinyl alcohol polymer composition having excellent thermal stability, water resistance, gas- and water-vapor-barrier properties, stability when its aqueous solution is kept at low temperatures, and biodegradability.

As a result of an intensive study to develop a vinyl alcohol polymer having the above favorable properties, the present inventors found a vinyl alcohol polymer having an ethylene unit content of 2 to 19 mole %, a polymerization degree of 200 to 2,000, a saponification degree of 80 to 99.99 mole % and a total content of carboxyl group and lactone rings of 0.02 to 0.4 mole %, and completed the invention.

BRIEF DESCRIPTION OF THE PREFERRED EMBODIMENTS

It is necessary that the vinyl alcohol polymer of the present invention have ethylene units. The content of ethylene units should be 2 to 19 mole %, and is preferably 2.5 to 17 mole %, more preferably 3 to 15 mole %, most preferably 3.5 to 13 mole %. If the ethylene unit content is less than 2 mole %, the above thermal stability, water resistance, gas-barrier properties, water vapor-barrier property, stability of aqueous solution when kept at low temperatures and biodegradability will be improved only to small extents. On the other hand, if the ethylene unit content exceeds 19 mole %, the water solubility, which is the key feature of PVA, will decrease.

The content of ethylene units in the vinyl alcohol polymer of the present invention is determined by proton NMR on the polyvinyl ester having ethylene units, which is the precursor of the vinyl alcohol polymer. The obtained polyvinyl ester is sufficiently purified by at least 3 processes of reprecipitation from n-hexane/acetone and then vacuum dried at 80° C. for 3 days, to yield a polyvinyl ester for analysis. The polymer is dissolved in DMSO-$D_6$ and the solution is subjected to 500 MHz proton NMR (with GX-500, JEOL) at 80° C. The ethylene unit content is obtained by calculation from a peak (4.7 to 5.2 ppm) originating from the main chain methyne of the vinyl ester and peaks (0.8 to 1.6 ppm) from the main chain methylene of ethylene, vinyl ester and the third component used.

The vinyl alcohol polymer of the present invention has a viscosity average degree of polymerization (hereinafter referred to simply as "polymerization degree") of 200 to 2,000, preferably 220 to 1,800, more preferably 240 to 1,600, most preferably 250 to 1,500. If the polymerization degree is less than 200, it will become difficult to process the polymer into films and other molded articles and to obtain satisfactory products. Furthermore, the obtained products will have low mechanical strength, thus shrinking from the feature of PVA. On the other hand, if the polymerization degree exceeds 2,000, the melt viscosity on melt molding or, on processing of an aqueous solution of the polymer, the viscosity of the aqueous solution will become high, so that the operability and processability become worse and satisfactory products cannot be obtained.

The polymerization degree (P) of vinyl alcohol polymers is determined in accordance with JIS-K6726, as follows. A vinyl alcohol polymer sample is re-saponified and, after purification, tested for the intrinsic viscosity [η] (dl/g) in water at 30° C. The polymerization degree is obtained with the following formula:

$$P = ([\eta] \times 10^3 / 8.29)^{(1/0.62)}$$

The degree of saponification of the vinyl alcohol polymer of the present invention is 80 to 99.99 mole %, preferably 84 to 99.9 mole %, more preferably 87 to 99.7 mole %, most preferably 90 to 99.5 mole %. If the degree of saponification is less than 80 mole %, the vinyl alcohol polymer will have markedly low crystallinity, thereby failing to exhibit the high gas-barrier properties, water-vapor-barrier property and water resistance intended by the present invention. In addition, the polymer will have poor thermal stability, and hence cannot be melt molded satisfactorily due to thermal decomposition and gelation.

On the other hand, if the degree of saponification exceeds 99.99 mole %, the vinyl alcohol polymer will not be producible stably and the resulting polymer will not be stably moldable into shapes or films.

The total content of carboxyl group and lactone rings in the vinyl alcohol polymer of the present invention is 0.02 to 0.4 mole %, preferably 0.022 to 0.37 mole %, more preferably 0.024 to 0.33 mole %, most preferably 0.025 to 0.3 mole %. The carboxyl group referred to herein includes its alkali metal salts, such as potassium salt and sodium salt.

If the total content of carboxyl group and lactone rings is less than 0.020 mole %, the polymer will have poor thermal stability, so that its melt moldability decreases due to gelation. In this case, its aqueous solution has low viscosity stability at low temperatures, or its high-concentration aqueous solution has low viscosity stability. In any case, there cannot be obtained the vinyl alcohol polymer intended by the invention. On the other hand, if the total content of carboxyl group and lactone rings exceeds 0.4 mole %, the PVA will have poor thermal stability on melting, so that it cannot be melt molded due to thermal decomposition and gelation. The gas- and water vapor-barrier properties and water resistance of the polymer will also become worse, perhaps due to high affinity with water. Furthermore, the polymer will sometimes become of decreased biodegradability.

It has further been found that the effect of the present invention is markedly enhanced when the total content of carboxyl group and lactone rings satisfies the following condition (1).

$$-1.94 \times 10^{-5} \times P + 0.044 \leq \text{Content} \leq -1.39 \times 10^{-4} \times P + 0.42 \quad (1)$$

wherein "Content" (in mole %) means the total content of carboxyl group and lactone rings and P represents the viscosity average degree of polymerization of the vinyl alcohol polymer.

The vinyl alcohol polymer comprising ethylene units in the specific amount, as well as carboxyl group and lactone rings may be produced by, for example, the following processes.

① A process which comprises copolymerizing a vinyl ester monomer such as vinyl acetate with a monomer capable of forming carboxyl group and lactone rings to obtain a vinyl ester polymer and then saponifying the obtained polymer in a solution in alcohol or dimethyl sulfoxide;

② A process which comprises polymerizing a vinyl ester monomer in the presence of a thiol containing carboxyl group, such as mercaptoacetic acid or 3-mercaptopropionic acid and then saponifying the obtained polymer;

③ A process which comprises, on polymerization of a vinyl ester monomer such as vinyl acetate, effecting chain transfer reaction to the alkyl group of the vinyl ester monomer or vinyl ester polymer, to obtain a highly branched vinyl ester polymer and then saponifying the obtained polymer;

④ A process which comprises reacting a copolymer of a monomer having epoxy group and a vinyl ester monomer, with a thiol having carboxyl group and then saponifying the resulting product; and ⑤ A process which comprises effecting acetalization of PVA with an aldehyde having carboxyl group.

Examples of vinyl ester monomers usable for producing the vinyl alcohol polymer of the present invention are vinyl formate, vinyl acetate, vinyl propionate, vinyl valerate, vinyl caprate, vinyl laurate, vinyl stearate, vinyl benzoate, vinyl pivalate and vinyl versatate. Among these, vinyl acetate is preferably used for producing PVA.

Examples of monomers capable of forming carboxyl group and lactone rings and usable for producing the vinyl alcohol polymer of the present invention are monomers having carboxyl group, derivable from fumaric acid, maleic acid, itaconic acid, maleic anhydride, itaconic anhydride and the like; acrylic acid and salts thereof; acrylic acid esters, e.g. methyl acrylate, ethyl acrylate, n-propyl acrylate and i-propyl acrylate; methacrylic acid and salts thereof; methacrylic acid esters, e.g. methyl methacrylate, ethyl methacrylate, n-propyl methacrylate and i-propyl methacrylate; acrylamide derivatives, e.g. acrylamide, N-methylacrylamide and N-ethylacrylamide; and methacrylamide derivatives, e.g. methacrylamide, N-methylmethacrylamide and N-ethylmethacrylamide.

The total content of carboxyl group and lactone rings in a vinyl alcohol polymer can be determined from the peaks obtained by proton NMR, as follows. The vinyl alcohol polymer is completely saponified to a degree of saponification of at least 99.95 mole %. The obtained polymer is then sufficiently washed with methanol and vacuum dried at 90° C. for 2 days, to yield a sample for analysis.

For the PVA prepared by the above process ①: the vinyl alcohol polymer sample for analysis thus prepared is dissolved in DMSO-$D_6$, and analyzed by 500 MHz proton NMR (with GX-500, JEOL) at 60° C. The content of the monomer of acrylic acid, acrylic acid esters, acrylamide or acrylamide derivatives is determined with use of the peak (2.0 ppm) originating from the main chain methyne, and that of the monomer of methacrylic acid, methacrylic acid esters, methacrylamide or methacrylamide derivatives with use of the peaks (0.6 to 1.1 ppm) originating from the methyl groups directly bound to the main chain, by the usual method. For monomers having carboxyl group and derivable from fumaric acid, maleic acid, itaconic acid, maleic anhydride or itaconic anhydride, after the prepared PVA sample for analysis has been dissolved in DMSO-$D_6$, a few drops of trifluoroacetic acid are added to the solution and the resulting solution is analyzed by 500 MHz proton NMR (with GX-500, JEOL) at 60° C. The content of lactone rings is obtained by the usual way with use of the peak at 4.6 to 5.2 ppm assigned to the methyne of lactone ring.

For the PVA prepared by the above process ② or ④, the content is obtained with use of the peak (2.8 ppm) originating from methylene bound to sulfur atom.

For the PVA prepared by the above process ③, the prepared PVA sample for analysis is dissolved in methanol-$D_4$/$D_2O=2/8$ and analyzed by 500 MHz proton NMR (with GX-500, JEOL) at 80° C. The peaks of 2.2 ppm and 2.3 ppm (integrated values A and B) are assigned to the methylenes of terminal carboxyl group and its alkali metal salt, respective-ly (the following chemical formulas (I) and (II)), the peak of 2.6 ppm (integrated value C) to the methylene of terminal lactone ring (the chemical formula (III)), and the peak of 3.5 to 4.15 ppm (integrated value D) to the methyne of vinyl alcohol units. The total content of carboxyl group and lactone ring is obtained with the following formula:

Total content=$50 \times (A+B+C) \times (100-\Delta)/(100 \times D)$ where $\Delta$ represents the modification ratio (mole %)

Chemical formula (I): (Na) HOOC$\underline{CH_2}$CH$_2$CH$_2$~

Chemical formula (II): (Na)OOC$\underline{CH_2}$CH$_2$CH (OH)~

Chemical formula (III):

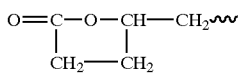

For the PVA prepared by the above process ⑤: the prepared PVA sample for analysis is dissolved in DMSO-$D_6$, and analyzed by 500 MHz proton NMR (with GX-500, JEOL) at 60° C. The content is obtained in the usual manner with use of the peak of 4.8 to 5.2 ppm originating from the methyne of acetal part (the following chemical formula (IV).

Chemical formula (IV):

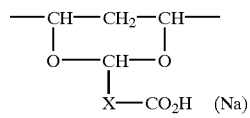

wherein X represents an alkyl group having 0 to 10 carbon groups.

Within limits not to impair the effect of the present invention, the vinyl alcohol polymer of the present invention may contain monomer units other than vinyl alcohol units, ethylene units, vinyl ester units and the above described monomer units capable of forming carboxyl group and lactone rings. Examples of such other monomers are α-olefins, e.g. propylene, 1-butene, isobutene and 1-hexene; vinyl ethers, e.g. methyl vinyl ether, ethyl vinyl ether, n-propyl vinyl ether, i-propyl vinyl ether and n-butyl vinyl ether; hydroxyl group-containing vinyl ethers, e.g. ethylene glycol vinyl ether, 1,3-propanediol vinyl ether and 1,4-butanediol vinyl ether; allyl ethers, e.g. allyl acetate, propyl allyl ether, butyl allyl ether and hexyl allyl ether; monomers containing an oxyalkylene group; vinyl silanes, e.g. vinyltrimethoxysilane; hydroxyl group-containing α-olefins, e.g. isopropenyl acetate, 3-buten-1-ol, 4-penten-1-ol, 5-hexen-1-ol, 7-octen-1-ol, 9-decen-1-ol and 3-methyl-3-buten-1-ol; sulfonic acid group-containing monomers, e.g. ethylenesulfonic acid, allylsulfonic acid, methallylsulfonic acid and 2-acrylamide-2-methylpropanesulfonic acid; and cationic group-containing monomers, e.g. vinyloxyethyltrimethylammonium chloride, vinyloxybutyltrimethylammonium chloride, vinyloxyethyldimethylamine, vinyloxymethyldiethylamine, N-acrylamidemethyltrimethylammonium chloride, 3-(N-methacrylamide)propyltrimethylammonium chloride, N-acrylamideethyltrimethylammonium chloride, N-acrylamidedimethylamine, allyltrimethylammonium chloride, methallyltrimethylammonium chloride, dimethylallylamine and allylethylamine. The content of these monomers may differ depending on the purpose or use, but is generally in an amount not more than 20 mole %, preferably not more than 10 mole %.

The vinyl alcohol polymer of the present invention includes terminal-modified PVA obtained by copolymerizing a vinyl ester monomer such as vinyl acetate and ethylene in the presence of a thiol such as 2-mercaptoethanol or n-dodecylmercaptan, except the above-described mercaptan having carboxyl group, and then saponifying the obtained copolymer.

The vinyl ester monomer used and ethylene may be copolymerized by any known process such as bulk polymerization, solution polymerization, emulsion polymerization or suspension polymerization. Among these processes, bulk polymerization with no solvent or in a solvent such as alcohols, or solution polymerization is generally employed. Examples of alcohols usable as solvent on solution polymerization are lower alcohols, e.g. methyl alcohol, ethyl alcohol and propyl alcohol. Examples of initiators usable for the copolymerization are known initiators such as azo-based and peroxide ones, e.g. 2,2'-azobisisobutyronitrile, 2,2'-azobis(2,4-dimethylvaleronitrile), benzoyl peroxide and n-propyl peroxydicarbonate. The polymerization temperature is, with no specific restrictions though, suitably selected within a range of 0 to 150° C. However, on setting the polymerization conditions, it is necessary, as obvious from the Examples to be described later, to select various conditions such that the vinyl alcohol polymer intended by the present invention can be smoothly obtained.

The vinyl alcohol polymer of the present invention desirably has a melting point of 160 to 230° C., preferably 170 to 227° C., more preferably 175 to 224° C., most preferably 180 to 220° C. With a melting point lower than 160° C., the vinyl alcohol polymer tends to have decreased crystallinity, so that satisfactory shaped articles having sufficient water resistance, gas- and water vapor-barrier properties and mechanical strength cannot be obtained therefrom. On the other hand, a high melting point of more than 230° C. may render it difficult to produce shaped articles stably from the polymer.

The melting point of a vinyl alcohol polymer means the peak-top temperature of an endothermic peak showing the melting point of the vinyl alcohol polymer when the polymer has been, with DSC, in nitrogen, heated at a temperature elevation rate of 10° C./min to 250° C., then cooled to room temperature and heated again at a temperature elevation rate of 10° C./min to 250° C.

The vinyl alcohol polymer of the present invention exhibits biodegradability and is, when subjected to activated sludge treatment or buried in the ground, decomposed into water and carbon dioxide. Continuous treatment of the PVA with activated sludge can decompose the polymer completly in 2 days. From the standpoint of this biodegradability, the vinyl alcohol polymer should be water-soluble or water-dispersible. To this end, the vinyl alcohol polymer preferably has a 1,2-glycol bond content of 1.2 to 2 mole %, more preferably 1.25 to 1.95 mole %, most preferably 1.3 to 1.9 mole %. If the 1,2-glycol bond content of a vinyl alcohol polymer is less than 1.2 mole %, the vinyl alcohol polymer will sometimes have not only poor biodegradability but poor moldability due to too high a melt viscosity. On the other hand, if the 1,2-glycol bond content of a vinyl alcohol polymer exceeds 2 mole %, the polymer will tend to become of poor gas- and water vapor-barrier properties and water resistance, due perhaps to decreased crystallinity of the polymer.

The 1,2-glycol bond content of a vinyl alcohol polymer can, for example, be controlled by using a third component of copolymerization, such as ethylene carbonate, or by adjusting the polymerization temperature. The 1,2-glycol bond content can be determined from the peak of NMR, as follows. A vinyl alcohol polymer sample is saponified to a degree of saponification of at least 99.9 mole %, washed sufficiently with methanol and then vacuum dried at 90° C. for 2 days. The PVA sample is then dissolved in DMSO-$D_6$ and, after addition of a few drops of trifluoroacetic acid, tested by 500 MHz proton NMR (with GX-500, JEOL) at 80° C.

The peak of 3.2 to 4.0 ppm. (integrated value A') is assigned to the peak originating from the methyne of vinyl alcohol unit and that of 3.25 ppm (integrated value B') to one of the methynes of 1,2-glycol bond. The 1,2-glycol bond content is obtained with the following formula:

1,2-Glycol bond content (mole %)=B'×(100−Δ)/A' where Δ means the ratio of ethylene modification (mole %)

In the present invention, "a hydroxyl group of vinyl alcohol unit located at the center of 3 successive vinyl alcohol unit chain in terms of triad expression" means the peak (I) reflecting the tacticity of a triad of hydroxyl group protons when a PVA solution in DMSO-$D_6$ is tested by 500 MHz proton,NMR (with GX-500, JEOL) at 65° C.

The peak (I) is the sum of, in terms of triad expression of hydroxyl groups of the PVA, an isotacticity chain (4.54 ppm), a heterotacticity chain (4.36 ppm) and a syndiotacticity chain (4.13 ppm), while the peak (II) originating from hydroxyl groups in all vinyl alcohol units apears in a region of chemical shift 4.05 ppm to 4.70 ppm. The molar fraction, based on vinyl alcohol units, of a hydroxyl group of vinyl alcohol unit located at the center of 3 successive vinyl alcohol unit chain in terms of triad expression is, in the present invention, obtained by 100×(I)/(II).

In the present invention, it has been found that by controlling at an appropriate level the amount, based on vinyl alcohol units, of a hydroxyl group of vinyl alcohol unit located at the center of 3 successive vinyl alcohol unit chain of a vinyl alcohol polymer, the following properties of the polymer can be controlled. The properties include those related to water, e.g. water solubility, moisture absorbing capability, water resistance and barrier properties and those related to melt moldability, e.g. melting point, melt viscosity and melt flowability. This is attributable to the fact that the hydroxyl group of vinyl alcohol unit located at the center of 3 successive vinyl alcohol unit chain has good crystallinity and hence enables the features of the vinyl alcohol polymer to develop sufficiently.

The content of a hydroxyl group of vinyl alcohol unit in 3 successive vinyl alcohol unit chain in terms of triad expression in the vinyl alcohol polymer of the present invention is preferably 65 to 98 mole %, more preferably 70 to 97.5 mole %, still more preferably 72 to 97 mole %, still more preferably 74 to 96 mole %, and most preferably 75 to 95 mole %.

If the content of a hydroxyl group of vinyl alcohol unit located at the center of 3 successive vinyl alcohol unit chain in terms of triad expression of a vinyl alcohol polymer is less than 65%, the polymer will tend to have markedly low crystallinity. Then, the polymer will not exhibit the high gas- and water-vapor-barrier properties and water resistance. Also, the polymer will have poor thermal stability, thereby becoming unable to undergo satisfactory melt molding. Furthermore, the mechanical properties, which are key features of vinyl alcohol polymers in general, of the obtained films, shaped articles are impaired. On the other hand, if the content of a hydroxyl group of vinyl alcohol unit located at the center of 3 successive vinyl alcohol unit chain in terms of triad expression of a vinyl alcohol polymer exceeds 98 mole %, the polymer will tend to have markedly high crystallinity. As a result, preparation of its aqueous solution requires much labor. Furthermore, the polymer has high melting point, which requires high melt molding temperature. The polymer then has poor thermal stability on melt molding and readily decomposes or gels, causing severe coloration.

It has also been found that the effect of the present invention is markedly enhanced when the vinyl alcohol polymer of the present invention has such a molar fraction, based on vinyl alcohol units, of a hydroxyl group of vinyl alcohol unit located at the center of 3 successive vinyl alcohol unit chain in terms of triad expression, that satisfies the following formula (2):

$$-1.5 \times Et + 100 \geq \text{molar fraction} \geq -Et + 85 \qquad (2)$$

wherein "molar fraction" (in mole %) means the molar fraction, based on vinyl alcohol units, of the hydroxyl group of vinyl alcohol unit located at the center of 3 successive vinyl alcohol unit chain in terms of triad expression, and Et represents the content (in mole %) of ethylene in the vinyl alcohol polymer.

The ethylene-modified vinyl alcohol polymer composition of the present invention has the key feature of containing an alkali metal. The content of the alkali metal (B) in terms of sodium (B) based on 100 parts by weight of the vinyl alcohol polymer (A) is 0.0003 to 1 part by weight, preferably 0.0003 to 0.8 part by weight, more preferably 0.0005 to 0.6 part by weight, most preferably 0.0005 to 0.5 part by weight. Examples of the alkali metal are potassium and sodium, which are mainly present as a salt of a lower aliphatic acid such as acetic acid or propionic acid, a salt of the carboxyl group contained in the PVA of the present invention and containing a specific amount of carboxyl group, or a salt of a sulfonic acid which may be contained in a copolymerization monomer. The alkali metal may also be present in an additive to the composition.

If the content of an alkali metal is less than 0.0003 part by weight, the water solubility when the vinyl alcohol polymer is used in the form of an aqueous solution will decrease and the polymer does not develop satisfactory features. Where the vinyl alcohol polymer is used under melting conditions, the polymer gels severely on melting, thereby exhibiting poor melt moldability. As a result, not only the productivity decreases, but the resultant shaped articles do not have sufficient water solubility. On the other hand, if the content of an alkali metal exceeds 1 part by weight, the polymer will show poor thermal stability on melting and severely decompose, gel or color, thereby becoming unable to be molded into shapes. Furthermore, the gas- and water vapor-barrier properties become worse perhaps due to decrease of the crystallinity.

In the present invention, there are no specific restrictions with respect to the process of incorporating the specific amount of an alkali metal (B). There may thus be employed a process which comprises adding a compound containing an alkali metal to the once obtained vinyl alcohol polymer or, preferably, a process which comprises, on saponification of a vinyl ester polymer in a solvent, using as a saponification catalyst an alkaline substance containing an alkali metal, thereby incorporating the alkali metal in the resulting vinyl alcohol polymer and then washing the saponified vinyl alcohol polymer with a washing liquid to control the content of the alkali metal in the resulting vinyl alcohol polymer. This latter process is preferred.

The content of an alkali metal is determined by atomic absorption photometry.

The vinyl alcohol polymer of the present invention, containing a specific amount of ethylene units, may be produced by any known process such as one which comprises copolymerizing ethylene and a vinyl ester monomer to obtain a vinyl ester polymer and then saponifying the polymer in an alcohol or dimethyl sulfoxide.

Examples of alkaline substances usable as a saponification catalyst are potassium hydroxide and sodium hydroxide. The molar ratio of the alkaline substance used as a saponification catalyst is, based on vinyl acetate units, preferably 0.004 to 0.5, more preferably 0.005 to 0.05. The saponification catalyst may be added all at once at an early stage of saponification reaction or further added during the reaction.

The saponification is conducted in a solvent such as methanol, methyl acetate, dimethyl sulfoxide or dimethyl-formamide. Of these solvents, preferred is methanol, more preferably methanol having a water content of 0.001 to 1% by weight, still more preferably methanol having a water content of 0.003 to 0.9% by weight, most preferably methanol having a water content of 0.005 to 0.8% by weight. The saponification is preferably carried out at a temperature of 5 to 80° C., more preferably 20 to 70° C. and preferably for 5 minutes to 10 hours, more preferably for 10 minutes to 5 hours. The saponification may be conducted by a known process such as batch process or continuous process.

As examples of the washing liquid to be used after the saponification, there may be mentioned methanol, acetone, methyl acetate, ethyl acetate, hexane and water. Among these, use of methanol, methyl acetate or water, either singly or in combination, is preferred.

The amount of the washing liquid is adjusted such that the content of an alkali metal (B) falls within the satisfactory range and is generally, based on 100 parts by weight of PVA, 30 to 10,000 parts by weight, more preferably 50 to 3,000 parts by weight. The washing temperature is preferably 5 to 80° C., more preferably 20 to 70° C. The washing time is preferably 20 minutes to 10 hours, more preferably 1 hour to 6 hours. The washing may be conducted batch-wise, by counter-current washing or by other known processes.

The vinyl alcohol polymer and its composition of the present invention can be obtained, as is apparent from the description of the Examples to be given later, by properly selecting the polymerization conditions (polymerization temperature, amounts of vinyl acetate, solvent and ethylene, successive addition conditions of ethylene and initiator, ethylene pressure on polymerization, polymerization time, conversion, and addition conditions of delay such as maleic anhydride) and the saponification conditions (concentration of polyvinyl acetate, amount of alkali, temperature, time, neutralization conditions and washing conditions). If appropriate conditions were not selected, the intended vinyl alcohol polymer or its composition could not be obtained.

The vinyl alcohol polymer of the present invention, having a specific ethylene content, polymerization degree, degree of saponification, and specific amounts of carboxyl group and lactone rings, 1,2-glycol bond and 3 successive vinyl alcohol unit chain, and its composition comprising a specific amount of an alkali metal have markedly better thermal stability compared to conventional PVA and are useful as resins for melt molding.

The amount of gel generated when a resin is heat treated at a temperature for a certain time is taken as an index of the thermal stability of the resin. With the vinyl alcohol polymer and its composition of the present invention, the gel generation is small compared to conventional PVA. This fact means that the vinyl alcohol polymer and its composition of the present invention are markedly excellent in melt moldability in commercial operations, which should be run stably over a long period of time.

The mechanism involved in the development of high thermal stability by the ethylene-modified PVA and its composition of the present invention is not clear. It is, however, estimated that the key role is played by the ethylene-modified PVA having a specific polymerization degree and degree of saponification, and specific amounts of carboxyl group, lactone rings, 1,2-glycol bond, hydroxyl group chain and an alkali metal, in particular having a specific ethylene modification ratio and specific amounts of carboxyl group and lactone rings.

The vinyl alcohol polymer or the composition of the present invention may, within limits not to impair the purpose and effect of the present invention, incorporate as necessary the usual additives, e.g. filler, processability stabilizer such as copper compound, weatherability improving agent, color, UV absorber, light stabilizer, antioxidant, antistatic, flame retardant, plasticizer, other thermoplastic resins, lubricant, perfume, foaming agent, deodorant, extender, release agent, reinforcing agent, mildew proof agent, antiseptic and crystallization retarding agent. In particular, addition of, as a thermal stabilizer, organic stabilizers, e.g. hindered phenol, copper halides such as copper iodide, and alkali metal halides such as potassium iodide is preferred, since the addition improves stability during dwell time when the vinyl alcohol polymer is being melt molded.

Among the above additives, plasticizers have the effects of decreasing the melting point, thereby further improving the melt moldability and providing the obtained molded products with flexibility and toughness. Any plasticizer may be used for this purpose, insofar as it can decrease the glass transition point or melt viscosity of the PVA. Examples, but with no limitations thereto, of usable plasticizers include, but not limited to, glycerine; diols, e.g. 1,3-butanediol and 2,3-butanediol; glycols, e.g. ethylene glycol, diethylene glycol, triethylene glycol, tetraethylene glycol, polyethylene glycol, polypropylene glycol, trimethylene glycol, tetramethylene glycol, penta methylene glycol, hexamethylene glycol and propylene glycol; glycerine derivatives, e.g. polyhydric alcohols such as sorbitol, glycerine and diglycerine, to which ethylene oxide or propylene oxide has added; sorbitol; pentaerythritol; saccharides; polyethers; phenol derivatives, e.g. bisphenol A and bisphenol S; amides, e.g. N-methylpyrrolidone; trimethylolpropane; diglycerine; 3-methyl-1,3,5-pentanetriol and a small amount (not more than 20%) of water. These plasticizers may be added in an amount based on 100 parts by weight of the vinyl alcohol polymer of preferably not more than 30 parts by weight, more preferably 20 parts by weight and most preferably 10 parts by weight.

Examples of other thermoplastic polymers that may be used in combination of the vinyl alcohol polymer of the present invention are general-purpose resins such as polyethylene, polystyrene and ABS.

Among the above additives, fillers have the effects of increasing the hardness and rigidity to provide a solid hand, developing blocking-preventing property and controlling the rate of water-degradation or biodegradation. Examples of usable fillers are known inorganic fillers, e.g. kaolin, clay, talc, acid clay, silica, alumina, diatomaceous earth, bentonite, montmorillonite, knot clay, agalmatolite, alunite, porcelain clay, faldspar, graphite, pearlite, calcium carbonate, magnesium hydroxide, carbon black, titanium oxide, mica, zirconia, boron nitride, aluminum nitride, shirasu, glass and glass fiber; and organic fillers, e.g. urea-formaldehyde resin and melamine-formaldehyde resin. The average particle size of inorganic fillers usable in the present invention is, with no specific limitation though, preferably 0.1 to 100 $\mu$m.

Although there is no particular limitation to the amount of fillers added, it is preferably not more than 400 parts by weight based on 100 parts by weight of the vinyl alcohol polymer, more preferably not more than 200 parts by weight on the same basis.

Where the above additives are incorporated into the vinyl alcohol polymer of the present invention, there are no specific restrictions with respect to the process of addition. These stabilizer, plasticizer, filler and other additives may be simply added to the vinyl alcohol polymer, or melt kneaded therewith to form pellets. Thus, these additives and the vinyl alcohol polymer may separately be fed to a melt kneader at constant rates, to undergo kneading and pelletization.

The vinyl alcohol polymer of the present invention may be melt molded by, for example, extrusion molding, injection molding, film formation by extrusion through a T-die, tubular film process, compression molding, transfer molding, molding into reinforced plastics, hollow molding, pressing, blow molding, calendering, foaming, vacuum forming and pressure-vacuum molding. Another thermoplastic resin may as desired be laminated with the vinyl alcohol polymer of the present invention.

Naturally, the vinyl alcohol polymer of the present invention can, in the form of a solution in a solvent such as water or dimethyl sulfoxide, be processed into shaped articles.

These processes can give shaped articles having any optional shape, such as film, sheet, tube or bottle.

The vinyl alcohol polymer of the present invention, having a specific ethylene content, polymerization degree, degree of saponification, and specific amounts of carboxyl group, lactone rings, 1,2-glycol bond and 3 successive vinyl alcohol unit chain, and its composition comprising a specific amount of an alkali metal further have the feature of exhibiting excellent oxygen-barrier property and are hence useful as resin for oxygen-barrier films.

That is, the vinyl alcohol polymer and its composition of the present invention have a small oxygen transmission rate as determined by the specific method shown below, which is an index of oxygen-barrier property, compared to conventional PVA. The mechanism involved in the development of high oxygen-barrier property by the ethylene-modified PVA and its composition of the present invention is not clear. It is, however, estimated that the key role is played by the ethylene-modified PVA having a specific polymerization degree and degree of saponification, and a specific amount of carboxyl group and lactone rings, 1,2-glycol bond, hydroxyl group of vinyl alcohol unit located at the center of 3 successive vinyl alcohol unit chain and an alkali metal, in particular having a specific ethylene modification ratio, a specific amount of carboxyl group and lactone rings, and a specific alkali.

The oxygen transmission rate is determined as follows. A film obtained from a vinyl alcohol polymer is heat treated in air (preferably at 100 to 240° C., more preferably at 120 to 240° C.; for preferably 10 to 300 seconds, more preferably 30 to 180 seconds) and, after conditioning at 20° C., 80% RH, tested for the oxygen transmission rate. The obtained value is then converted into the one corresponding to a film thickness of 20 $\mu$m.

For a laminate sample, the sample is, as it is, measured for the oxygen transmission rate, which is then converted into the rate corresponding to a vinyl alcohol polymer layer thickness of 20 $\mu$m.

Laminates exhibit oxygen-barrier property because they have been subjected to some kind of heat treatment. Further heat treatment is therefore not necessary on determination of oxygen transmission rate for laminate samples.

The oxygen-barrier property of a base film for a laminate is very low compared to that of a film comprising the vinyl alcohol polymer, and hence the oxygen-barrier property of the laminate is substantially governed by that of the vinyl alcohol polymer film constituting the laminate. For this reason, even for a laminate it is possible to obtain an oxygen transmission rate corresponding to the constituting vinyl alcohol polymer film having a thickness of 20 $\mu$m. Hereinbelow, the oxygen transmission rate means, unless otherwise indicated, that converted into a value corresponding to a PVA film thickness of 20 $\mu$m.

The oxygen-barrier property in terms of oxygen transmission rate as determined by the above method is, for practical purposes, preferably not more than 15 cc/m$^2$.day.atm, more preferably not more than 10 cc/m$^2$.day.atm, most preferably 5 cc/m$^2$.day.atm.

The vinyl alcohol polymer may be applied onto a base film to form laminates. Examples of the base film are polyolefin films, polyester films and polyamide films.

These base films preferably have a thickness (when the laminates are stretched, the thickness of the finished base films) of 5 to 100 μm.

On producing a laminate by applying the vinyl alcohol polymer of the present invention on a base film, use of a crosslinking agent in combination is desirable, although the vinyl alcohol polymer may be used alone. Examples of the crosslinking agent are epoxy compounds, isocyanate compounds, aldehyde compounds, silica compounds, aluminum compounds, zirconium compounds and boron compounds, of which silica compounds, such as colloidal silica and alkyl silicates are preferred. These crosslinking agents are added in an amount based on 100 parts by weight of the vinyl alcohol polymer of, generally 5 to 60 parts by weight, preferably 10 to 40 parts by weight, more preferably 15 to 30 parts by weight. A high addition exceeding 60 parts by weight sometimes impairs the oxygen-barrier property.

On producing a laminate by applying the vinyl alcohol polymer on a base film, the polymer is generally applied in the form of an aqueous solution. There is no particular limitation to the concentration of the aqueous solution, but it is desirably 5 to 50% by weight. A low concentration of less than 5% by weight causes the drying load to increase, while a high concentration exceeding 50% by weight increases the viscosity of the aqueous solution, thereby decreasing the applicability.

The aqueous solution of the vinyl alcohol polymer may, on application, contain a surface active agent, a levelling agent and the like. The aqueous solution may also contain up to about 30% by weight of a lower aliphatic alcohol such as methanol, ethanol or isopropyl alcohol, which leads to better applicability.

The aqueous solution of the vinyl alcohol polymer may further contain a mildew-proof agent, antiseptic and the like. The aqueous solution of the vinyl alcohol polymer is applied at a temperature of preferably 20 to 80° C. The application is conducted suitably by gravure roll coating, reverse gravure coating, reverse roll coating or Meyer bar coating.

With respect to the timing of when to apply an aqueous solution of the vinyl alcohol polymer, the application may be conducted either after the base film has been stretched or heat treated or before such treatment. In view of operability, it is desirable to carry out the steps of subjecting a base film to a first-stage stretching, applying the aqueous solution and then subjecting the film with the solution to a second-stage stretching, during or after which conducting heat treatment of the laminate. The thickness of the vinyl alcohol layer (final thickness when stretching is conducted) is preferably 0.1 to 20 μm.

An adhesive component layer may be formed to improve the adhesiveness, between a film layer comprising the vinyl alcohol polymer and a base film layer. The adhesive component can be applied on the surface of the base film before application of an aqueous solution of the vinyl alcohol polymer, or may be mixed into the aqueous solution and used.

Gas-barrier laminated films comprising a film layer of the vinyl alcohol polymer generally further have a layer of a heatsealable resin on the polymer layer. The heatsealable resin layer is generally formed by extrusion lamination or dry lamination. Examples of the heatsealable resin are polyethylene resins, e.g. HDPE, LDPE and LLDPE, polypropylene resin, ethylene-vinyl acetate copolymer, ethylene-α-olefin random copolymers and ionomer resins.

There are no specific restrictions with respect to whether stretching is conducted or not, the heat treatment temperature and like conditions. Usually, after application of the vinyl alcohol polymer on an oriented film of a polyolefin, polyester or polyamide at a temperature suitable for the pertinent resin, the laminate is heat treated in air or the like. The suitable heat treatment temperature is 140 to 170° C. for polyolefin base films and 140 to 240° C. for polyester and polyamide base films. The vinyl alcohol polymer film layer is usually heated treated at the same time with the heat treatment of the base film used.

The vinyl alcohol polymer of the present invention, having a specific ethylene content, polymerization degree and degree of saponification, and a specific amount of carboxyl group and lactone rings, 1,2-glycol bond and 3 successive vinyl alcohol unit chain, and its composition can be used for examples as the following items. That is, they are usable as sizing agent for fibers, fiber treating agent, fiber processing agent, sizing agent for textile products, paper processing agents, e.g. clear-coating agent for paper, pigment-coating agent for paper, sizing agent to be added to slurry for producing paper, and binder for overcoating of heat-sensitive paper, heat-sensitive adhesive, defogging agent, paints, dispersing agent for organic and inorganic pigments, dispersion-stabilizing agent for emulsion polymerization, dispersion-stabilizing agent for polymerization of vinyl chloride, adhesive for paper, wood and plastics, binder for nonwovens, binder for fibers, binder for ceramics, binder for various construction materials such as gypsum board and fiber board, additive for cement and mortar, hot-melt adhesive, image-forming material, photosensitive resin, raw material for polyvinyl acetal for formal resins and butylal resins, substrate for gel, raw material for shaped articles such as films, sheets and tubes and soil conditioner. The vinyl alcohol polymer of the present invention may, utilizing its features, be either used alone or in combination with other polymers, e.g. unmodified or modified PVAs, starch (and its modified products), cellulose derivatives, gums, gelatin and casein; and plasticizers.

EXAMPLES

Other features of the invention will become apparent in the course of the following descriptions of exemplary embodiments which are given for illustration of the invention and are not intended to be limiting thereof. In the Examples and Comparative Examples that follow, "parts" and "%" mean "parts by weight" and "% by weight", respectively, unless otherwise indicated. The analysis, water solubility, water resistance and stability when kept at low temperatures of the obtained ethylene-modified PVAs were evaluated by the following methods.

[Analysis of ethylene-modified PVA]

PVA samples are analyzed in accordance with JIS-K6726, unless otherwise shown.

The amount of ethylene modification of an ethylene-modified PVA in the present invention is determined with use of the corresponding ethylene-vinyl acetate, and the total content of carboxyl group and lactone rings, amount of 1,2-glycol bond and amount, based on vinyl alcohol units, of a hydroxyl group of vinyl alcohol unit located at the center of 3 successive vinyl alcohol unit chain in terms of triad expression are determined with use of the modified PVA itself, from measurements with 500 MHz proton NMR apparatus (GX-500, JEOL) as described before.

The melting point of a modified PVA is obtained from the peak top temperature of an endothermic peak showing the melting point of the PVA when it has been, with DSC (TA3000, Metler Co., Ltd.) and in nitrogen, heated at a temperature elevation rate of 10° C./min up to 250° C., then cooled to room temperature and again heated at a temperature elevation rate of 10° C./min up to 250° C.

The content of alkali metal is determined by atomic absorption photometry.

[Water-solubility of ethylene-modified PVA]

A PVA sample is dispersed in distilled water in such an amount as to make the dissolution concentration 10%, and the dispersion is heated at a temperature of 95° C. with stirring for 3 hours to give an aqueous PVA solution. The solution is then cooled to 20° C. and evaluated by visual evaluation. The result is reported in terms of the following rating.

5: Completely dissolved in water; the aqueous solution is colorless and transparent.

4: Although completely dissolved in water, the aqueous solution is white opaque.

3: Although mostly dissolved in water, partly remains undissolved.

2: Considerably large amount of undissolved matter remains.

1: Completely undissolved.

[Water Resistance of ethylene-modified PVA]

An aqueous solution of a PVA sample is cast at 50° C. into a film having a thickness of 50 microns. Part of the obtained film is heat treated at 120° C. for 10 minutes. The film is immersed in water at 20° C. for 24 hours, then taken out and evaluated by rubbing with the hand. The tactile impression through the hand is evaluated in terms of the following 5-stage rating.

5: The film gives the same feeling as when it is dry and is firm.

4: Although relatively firm, the film gives a slimy feeling.

3: Although still keeping the shape, the film gives a very slimy feeling.

2: Although partly retaining the shape, the film cannot be taken out.

1: The film is completely dissolved.

[Stability of Viscosity of Aqueous Solution of ethylene-modified PVA when Kept at Low Temperatures]

A 10% aqueous solution of a PVA sample is placed in a 300-ml glass beaker and kept standing at 5° C. for 1 day. The viscosities of the solution before (η-initial) and after (η-1 day) the standing are measured and the ratio (low temperature viscosity increase ratio=η-1 day/η-initial) is obtained. The measurement is conducted with B-type viscosimeter (rotation: 12 rpm) at 5° C.

Example 1

A 250-l (liter) pressure reaction vessel equipped with a stirrer, nitrogen inlet, ethylene inlet, initiator addition port and delay solution addition port was charged with 107.2 kg of vinyl acetate, 42.8 kg of methanol and 15.6 g of maleic anhydride. The vessel was heated to 60° C. and the air inside the vessel was replaced with nitrogen by nitrogen bubbling for 30 minutes. Then ethylene was introduced to an inside pressure of 5.9 kg/cm². Separately, a 2.8 g/l (liter) solution of 2,2'-azobis(4-methoxy-2,4-dimethylvaleronitrile) (AMV) in methanol was prepared and the air inside was replaced with nitrogen by conducting bubbling with nitrogen, to give an initiator or solution. Also, a delay solution was prepared by preparing a 5% solution of maleic anhydride in methanol and then replacing the inside air by conducting bubbling with nitrogen. After the inside temperature of the above polymerization vessel had been adjusted to 60° C., 204 ml of the above initiator solution was introduced to start polymerization. Continuous polymerization was carried out while ethylene was introduced to maintain the pressure inside the reaction vessel at 5.9 kg/cm² and the polymerization temperature was maintained at 60° C., the above initiator solution was fed continuously at 640 ml/hr and the above delay solution was continuously added to keep constant the ratio between the amounts of vinyl acetate and maleic anhydride. After 4 hours, when the conversion reached 30%, the vessel was cooled to terminate the polymerization. Up to this point, the total amount of maleic anhydride delay solution added was 1400 ml. The reaction vessel was opened to discharge ethylene and then nitrogen was bubbled through the reaction mixture to discharge ethylene completely. Unreacted vinyl acetate monomer was then removed under reduced pressure, to obtain a polyvinyl acetate solution in methanol. Methanol was added to the obtained polyvinyl acetate solution to a concentration of 30%. Saponification was conducted by adding 46.5 g (molar ratio [MR] to vinyl acetate units present in the polyvinyl acetate of 0.10) of an alkali solution (10% NaOH solution in methanol) to 333 g (100 g of polyvinyl acetate in the solution) of the obtained methanolic solution of polyvinyl acetate. About 1 minute after the addition, the mixture gelled, and the gel was pulverized with a pulverizer. The powder was allowed to stand at 40° C. for 1 hour to permit the saponification to proceed and then 1,000 g of methyl acetate was added to neutralize the alkali. After completion of the neutralization had been checked with phenolphthalein indicator, the mixture was filtered, to yield a white solid PVA. To the PVA 1,000 g of methanol was added and the mixture was allowed to stand at room temperature for 3 hours to effect washing. After this washing procedure had been repeated 3 times, centrifugal separation gave a purified PVA, which was then kept in a dryer at 70° C. for 2 days to yield a dry PVA (PVA-1).

[Analysis of ethylene-modified PVA)

The thus obtained ethylene-modified PVA having carboxyl group and lactone rings showed a degree of saponification of 98.5 mole %. The sodium content of the modified PVA as tested with an atomic absorption photometer on a solution obtained by ashing the modified PVA and dissolving the ash in an acid, was 0.36 part by weight based on 100 parts by weight of the modified PVA.

The above methanolic solution of polyvinyl acetate obtained by removing unreacted vinyl acetate monomer after the polymerization was purified by 3 repeated procedures of reprecipitation from n-hexane and dissolution in acetone, and then dried at 80° C. under reduced pressure for 3 days, to give a purified polyvinyl acetate. The obtained polyvinyl acetate was dissolved in DSMO-$D_6$ and the solution was tested by 500 MHz proton NMR (with GX-500, JEOL) at 80° C., to show an ethylene content of 7 mole %. The above methanolic solution of polyvinyl acetate was also saponified with an alkali solution at an alkali molar ratio of 0.5 and the obtained gel was pulverized. The powder was allowed to stand at 60° C. for 5 hours to permit the saponification to proceed, then subjected to methanol Soxhlet washing for 3 days and dried at 80° C. under reduced pressure for 3 days, to yield a purified ethylene-modified PVA having carboxyl group and lactone rings. The obtained PVA, was tested in accordance with the usual method of JIS-K6726, to show an average polymerization degree of 1,000. The purified PVA was also tested by 500 MHz proton NMR (with GX-500, JEOL) for the total content of carboxyl group and lactone rings, amount of 1,2-glycol bond and amount, based on vinyl alcohol units, of a hydroxyl group of vinyl alcohol unit located at the center of 3 successive vinyl alcohol unit chain in terms of triad expression, to show 0.246 mole %, 1.61 mole % and 87%, respectively.

A 5% aqueous solution of the purified modified PVA was prepared and the solution was cast into a film having a thickness of 10 microns, which was then dried at 80° C. for 1 day under reduced pressure. The thus prepared specimen was tested for the melting point of the PVA with DSC (TA3000, Metler Co., Ltd.) by the above described method, to show that of 210° C.

[Water Solubility, Water Resistance and Stability of Viscosity at Low Temperatures of ethylene-modified PVA]

The ethylene-modified PVA (PVA-1) obtained above was evaluated for water solubility by the above-described method. The PVA was found to be completely dissolved in distilled water, to give a colorless transparent aqueous solution. The PVA was also evaluated for water resistance by the above method. The film obtained by casting at 50° C. and that further heat treated at 120° C. for 10 minutes both showed the same firm hand as shown by those before water immersion. The viscosity stability at 5° C. of a 10% aqueous solution of the PVA was tested. The aqueous PVA solution just after being placed at a temperature of 5° C. had a viscosity of 450 mPa.s and that after being kept at 5° C. for 1 day showed a viscosity of 500 mPa.s, so that the low temperature viscosity increase ratio was 1.1.

Examples 2 through 8, 11 through 18, 20 through 22, and 27 through 29

A series of vinyl ester polymers were synthesized in the same manner as in Example 1 except that the conditions were changed as shown in Table 1 and Table 2. From these, a series of PVAs were obtained in the same manner as in Example 1 except that the conditions were changed as shown in Table 3 and Table 4. The ethylene content, polymerization degree, degree of saponification, total content of carboxyl group and lactone rings, amount of 1,2-glycol bond, amount based on vinyl alcohol units of a hydroxyl group of vinyl alcohol unit located at the center of 3 successive vinyl alcohol unit chain in terms of triad expression, and content of alkali metal in terms of sodium based on 100 parts by weight of PVA, of the obtained PVAs are shown in Table 5 and Table 6. The water solubility, water resistance and low-temperature viscosity stability of the obtained PVAs are shown in Table 13 and Table 14.

Comparative Examples 1 through 7, 12 through 17, 19 through 21, and 24 through 25

A series of vinyl ester polymers were synthesized in the same manner as in Example 1 except that the conditions were changed as shown in Table 7 and Table 8, such as change of pressure on polymerization (on polymerization of PVA containing no ethylene, the polymerization was performed under an atmosphere sealed with nitrogen). From these, a series of PVAs were obtained in the same manner as in Example 1 except that the conditions were changed as shown in Table 9 and Table 10. The ethylene content, polymerization degree, degree of saponification, total content of carboxyl group and lactone rings, amount of 1,2-glycol bond, amount based on vinyl alcohol units of a hydroxyl group of vinyl alcohol unit located at the center of 3 successive vinyl alcohol unit chain in terms of triad expression, and content of alkali metal in terms of sodium based on 100 parts by weight of PVA, of the obtained PVAs are shown in Table 11 and Table 12. The water solubility, water resistance and low-temperature viscosity stability of the obtained PVAs are shown in Table 15 and Table 16.

As shown in Table 13 through Table 16, in the evaluation of the water solubility, water resistance and viscosity stability when kept at low temperatures, only those PVAs having the properties within they specified ranges of the present invention showed good results, while all PVAs mentioned as Comparative Examples showed poor results in all or some of the water solubility, water resistance and viscosity stability when kept at low temperatures. For example, PVAs not ethylene-modified of Comparative Examples 26 through 34 were poor either in water resistance or viscosity stability, while PVAs of Comparative Examples 35 and 36 modified otherwise than by ethylene were completely insoluble in water. The PVA of Comparative Example 48, although having good water solubility and water resistance, had poor viscosity stability when kept at low temperatures, so that its aqueous solution gelled after 1 day and hence its handling in the work place is difficult. The PVA of Example 40 had a viscosity increase ratio ($\eta$-1 day/$\eta$-initial) of 24.6, which may indicate poor viscosity stability compared to other PVAs of Examples. However, while PVAs of Comparative Examples having a polymerization degree and degree of saponification similar to those of the PVA of Example 40 gelled, in the same evaluation test, after only 1 day, the PVA of Example 40 maintained the state of solution with an aqueous solution viscosity of 270 mPa.s after 1 day, thus proving an increase in stability due to ethylene modification.

Example 9 and Comparative Example 8

In Example 9, a 250-l pressure reaction vessel equipped with a stirrer, nitrogen inlet, ethylene inlet and initiator addition port was charged with 76.6 kg of vinyl acetate, 73.3 kg of methanol and 217 g of allyl glycidyl ether, and the air inside the vessel was replaced by nitrogen in just the same manner as in Example 1. The procedure of Example 1 was repeated except that the conditions were changed as shown in Table 1, such as change in reaction pressure and amount of AMV, or no continuous addition of the comonomer allyl glycidyl ether, to conduct polymerization and obtain a series of vinyl ester polymers having allyl glycidyl ether units. After 3 hours, when the conversion reached 20%, the vessel was cooled to terminate the polymerization. The reaction vessel was opened to discharge ethylene and then nitrogen was bubbled through the reaction mixture to discharge ethylene completely. Unreacted vinyl acetate monomer was then removed under reduced pressure, to obtain a polyvinyl acetate solution in methanol. Methanol was added to the obtained polyvinyl acetate solution to a concentration of 35%. To 286 g of the methanolic solution of polyvinyl acetate thus obtained (polyvinyl acetate in the solution: 100 g), 0.54 g of 3-mercaptopropionic acid and 0.1 g of sodium acetate were added, and stirring was conducted at 50° C. for 2 hours. Saponification was conducted by adding to the solution 46.5 g of an alkali solution (10% NaOH solution in methanol). About 1 minute after the addition, the mixture gelled, and the gel was pulverized with a pulverizer. The powder was allowed to stand at 40° C. for 1 hour to allow the saponification to proceed and then 1,000 g of 1% solution of acetic acid in methanol was added to neutralize remaining alkali. After completion of the neutralization had been checked with phenolphthalein indicator, the mixture was filtered, to yield a white solid PVA. To the PVA 1,000 g of methanol was added and the mixture was allowed to stand at room temperature for 3 hours to effect washing. After this washing procedure had been repeated 3 times, centrifugal separation gave a purified PVA, which was then kept in a dryer at 70° C. for 2 days to yield a dry ethylene-modified PVA having carboxyl group (PVA-9). The results of analysis and evaluation conducted on the ethylene-modified PVA are shown in Table 5 and Table 13, respectively.

In Comparative Example 8, Example 9 was repeated except that conditions were changed as shown in Table 7 and Table 9, such as polymerization under ethylene pressure to polymerization under nitrogen seal, to obtain a carboxylic acid-modified PVA (PVA-37). The results of analysis and evaluation conducted on the obtained PVA are shown in Table 11 and 15, respectively.

Example 10 and Comparative Example 9

A 10% aqueous solution each was prepared by dissolving 10 g of the PVA-2 or PVA-31 in distilled water. Concentrated hydrochloric acid was added to each of the solution to adjust their pH at 1. To the solutions 0.52 g each of 4-oxo-butanoic acid was added, and the mixtures were stirred at 50° C. for 2 hours and then neutralized with NaOH solution to a pH of 7. The aqueous solutions were thrown into MeOH and the precipitated PVAs were filtered out. The PVAs were subjected to Soxhlet extraction (MeOH) for 3 days and dried in a dryer at 70° C. for 2 days, to yield an ethylene-modified PVA having carboxyl group (PVA-10) and a carboxylic acid-modified PVA (PVA-37), respectively. The results of analysis and evaluation on these PVAs were shown in Table 5 and Table 11, and Table 13 and Table 15, respectively.

As is understood from Table 5, saponification of a reaction product of a polyvinyl acetate having epoxy group and a thiol having carboxyl group as in Example 9, and addition of an aldehyde having carboxylic group to a PVA as in Example 10 can both introduce with no problem carboxyl group and lactone rings into PVA. As is also understood from Example 38 and Example 39 in Table 13, the carboxyl group and lactone rings introduced by such methods have completely the same function as in the case where these group and units have been introduced by copolymerization or like methods.

Examples 19, 25 and 26, and Comparative Example 18

A series of ternary copolymerization-modified PVAs (PVA-19, PVA-25, PVA-26 and PVA-47) were obtained in the same manner as in Example 1 except that ethyl vinyl ether or vinyltrimethoxysilane was, as a comonomer, added not continuously during polymerization but at once on feeding starting materials for polymerization, and that conditions were changed to those shown in Table 2, Table 4, Table 8 and Table 10. The results of analysis and evaluation of these PVAs are shown in Tables 6 and 12, and Tables 14 and 16, respectively.

Comparative Examples 10 and 11

Example 19 was repeated except that isobutene or 1-octene was copolymerized instead of ethylene and that conditions were changed to those shown in Table 7 and Table 9, to obtain an isobutene-modified PVA (PVA-39) and an 1-octene-modified PVA (PVA-40). The results of analysis and evaluation of these PVAs are shown in Table 11 and Table 15, respectively. These PVAs were insoluble in distilled water. The polymerization degree of each of these PVAs was therefore estimated from the viscosity measured on a 4% solution in DMSO at 20° C. The degree of saponification was obtained in accordance with JIS-K6726 except that these PVAs were dissolved in a 6/4 water/methanol solution.

Examples 23 and 24, and Comparative Examples 22 and 23

In Examples 23 and 24, Example 2 was repeated with use of the PVAc paste obtained by polymerization on synthesizing PVA-2, except that the washing method was changed to that shown in Table 4, to obtain PVAs having different alkali contents (PVA-23 and PVA-24). In Comparative Examples 22 and 23, Comparative Example 2 was repeated with use of the PVAc paste obtained by polymerization on synthesizing PVA-31, except that the washing method was changed to that shown in Table 10, to obtain PVA-51 and PVA-52. The results of analysis and evaluation on these PVAs were shown in Table 6 and Table 12, and Table 14 and Table 16, respectively.

TABLE 1

| | | Polymerization temperature (° C.) | VAc (kg) | MeOH (kg) | Ethylene pressure during polymerization (kg/cm²) | Delay | | | Initiator | | | | |
|---|---|---|---|---|---|---|---|---|---|---|---|---|---|
| | | | | | | Type[1] | Amount fed initially (g) | Total amount fed (ml) | Type[2] | Amount fed initially (ml) | Rate of continuous addition (ml/hr) | Polymerization time (hr) | Conversion (%) |
| Example | 1 | 60 | 107.2 | 42.8 | 5.9 | MAn | 15.6 | 1,400 | AMV | 204 | 640 | 4 | 30 |
| | 2 | 60 | 76.6 | 73.3 | 6.5 | — | — | — | AMV | 175 | 552 | 3 | 20 |
| | 3 | 60 | 119.8 | 30.1 | 4.7 | — | — | — | AMV | 116 | 360 | 4 | 25 |
| | 4 | 60 | 119.7 | 30.2 | 10.4 | IA | 6.3 | 2,485 | AMV | 168 | 536 | 5 | 30 |
| | 5 | 60 | 75.9 | 74.0 | 5.1 | MAn | 13.5 | 2,412 | AMV | 438 | 1,378 | 10 | 70 |
| | 6 | 60 | 123.0 | 26.9 | 2.6 | 3MPA | 2.3 | 1,581 | AMV | 355 | 1,118 | 7 | 50 |
| | 7 | 90 | 85.5 | 64.4 | 15.0 | IA | 3.8 | 2,177 | AIBN | 311 | 512 | 12 | 75 |
| | 6 | 60 | 108.0 | 41.9 | 10.4 | 3MPA | 4.1 | 3,046 | AMV | 525 | 1,652 | 10 | 70 |
| | 9 | 60 | 76.6 | 73.3 | 6.5 | AGE | 217 | — | AMV | 175 | 552 | 3 | 20 |
| | 10 | 60 | 76.6 | 73.3 | 6.5 | — | — | — | AMV | 175 | 552 | 3 | 20 |
| | 11 | 60 | 90.0 | 59.9 | 8.0 | 3MPA | 5.0 | 3,514 | AMV | 302 | 951 | 15 | 75 |
| | 12 | 60 | 106.1 | 43.9 | 1.4 | — | — | — | AMV | 53 | 168 | 4 | 20 |
| | 13 | 60 | 62.3 | 87.6 | 6.9 | IA | 3.3 | 1,782 | AMV | 399 | 1,257 | 12 | 70 |
| | 14 | 20 | 23.1 | 126.8 | 0.7 | — | — | — | NPP[3] | 198 | 714 | 12 | 75 |
| | 15 | 60 | 87.6 | 62.4 | 3.5 | MAn | 19.1 | 1,926 | AMV | 262 | 825 | 4 | 35 |

[1]MAn: maleic anhydride, 3MPA: 3-mercaptopropionic acid, IA: itaconic acid, AGE: allyl glycidyl ether
[2]AMV: 2,2'-azobis(4-methoxy-2,4-dimethylvaleronitrile), AIBN: 2,2'-azobis(isobutyronitrile)
[3]NPP: (n-propyl peroxydicarbonate)/N,N-dimethylaniline = 1/1

TABLE 2

| | Polymerization temperature (° C.) | VAc (kg) | MeOH (kg) | Ethylene pressure during polymerization (kg/cm²) | Delay Type[1] | Amount fed initially (g) | Total amount fed (ml) | Initiator Type[2] | Amount fed initially (ml) | Rate of continuous addition (ml/hr) | Polymerization time (hr) | Conversion (%) |
|---|---|---|---|---|---|---|---|---|---|---|---|---|
| Example 16 | 60 | 132.4 | 17.5 | 6.0 | — | — | — | AMV | 293 | 923 | 2 | 20 |
| 17 | 0 | 25.7 | 123.9 | 0.5 | — | — | — | NPP[3] | 499 | 1,799 | 12 | 65 |
| 18 | 60 | 78.4 | 71.5 | 4.2 | IA | 1.7 | 678 | AMV | 346 | 1,089 | 6 | 50 |
| 19 | 60 | 105.2 | 44.8 | 7.8 | EVE[4] | 18.23 | — | AMV | 429 | 1,352 | 5 | 45 |
| 20 | 60 | 78.3 | 71.7 | 5.7 | MAn | 5.3 | 837 | AMV | 255 | 804 | 10 | 60 |
| 21 | 40 | 36.4 | 112.8 | 3.5 | — | — | — | AMV | 3,962 | 887 | 4 | 30 |
| 22 | 60 | 103.9 | 46.0 | 4.0 | MAn | 7.1 | 792 | AMV | 359 | 1,131 | 4 | 40 |
| 23 | 60 | 76.6 | 73.3 | 6.5 | — | — | — | AMV | 175 | 552 | 3 | 20 |
| 24 | 60 | 76.6 | 73.3 | 6.5 | — | — | — | AMV | 175 | 552 | 3 | 20 |
| 25 | 60 | 72.1 | 77.8 | 4.3 | EVE[4] | 8.45 | — | AMV | 490 | 1,543 | 6 | 55 |
| 26 | 60 | 86.0 | 63.9 | 6.5 | VMS[4] | 0.3 | — | AMV | 587 | 1,849 | 5 | 50 |
| 27 | 60 | 112.9 | 37.0 | 8.4 | AMPS-Na | 60.5 | 11,538 | AMV | 313 | 985 | 5 | 40 |
| 28 | 60 | 61.0 | 89.0 | 1.8 | MAPTAC[5] | 136 | 12,742 | AMV | 328 | 1,034 | 10 | 70 |
| 29 | 60 | 96.3 | 53.7 | 2.0 | 2ME | 0.9 | 318 | AMV | 168 | 528 | 3 | 25 |

[1]MAn: maleic anhydride, IA: itaconic acid, AGE: allyl glycidyl ether, EVE: ethyl vinyl ether, VMS: vinyltrimethoxysilane, AMPS-Na: sodium 2-(N-acrylamide)-2-methylpropanesulfonate, MAPTAC: 3-(N-methacrylamide)propyltrimethylammonium chloride, 2ME: 2-mercaptoethanol
[2]AMV: 2,2'-azobis(4-methoxy-2,4-dimethylvaleronitrile)
[3]NPP: (n-propyl peroxydicarbonate/N,N-dimethylaniline = 1/1);
[4]The amount fed initially is in kg.
[5]Concentration of delay solution: 10%

TABLE 3

| | | Saponification conditions | | | | | |
|---|---|---|---|---|---|---|---|
| | PVAc concentration (%) | Alkali ratio (MR) | Temperature (° C.) | Time (hr) | Neutralization[1] | Washing[2] | PVA |
| Example 1 | 30 | 0.10 | 40 | 1 | ① | ① | PVA-1 |
| 2 | 35 | 0.10 | 60 | 2 | ① | ② | PVA-2 |
| 3 | 25 | 0.10 | 60 | 4 | ③ | ② | PVA-3 |
| 4 | 30 | 0.04 | 40 | 1 | ① | ① | PVA-4 |
| 5 | 40 | 0.015[3] | 40 | 1 | ② | ① | PVA-5 |
| 6 | 35 | 0.015 | 40 | 1 | ① | ① | PVA-6 |
| 7 | 50 | 0.08 | 60 | 1 | ① | ② | PVA-7 |
| 8 | 40 | 0.10 | 60 | 3 | ① | ① | PVA-8 |
| 9 | 35 | 0.10 | 60 | 2 | ① | ① | PVA-9 |
| 10 | 35 | 0.10 | 60 | 2 | ① | ② | PVA-10 |
| 11 | 50 | 0.15 | 60 | 2 | ③ | ② | PVA-11 |
| 12 | 25 | 0.10 | 60 | 1 | ③ | ① | PVA-12 |
| 13 | 50 | 0.10 | 40 | 1 | ① | ① | PVA-13 |
| 14 | 50 | 0.10 | 60 | 1 | ③ | ② | PVA-14 |
| 15 | 30 | 0.10 | 60 | 2 | ① | ② | PVA-15 |

[1]①: Neutralized with methyl acetate, ②: neutralized with acetic acid solution in methanol, ③ not neutralized.
[2]①: Washed 3 times with methanol alone, ②: washed twice with a mixed solvent of water/methanol = 1/9 and then washed twice with methanol alone.
[3]A 10% methanolic KOH solution was used as alkali.

TABLE 4

| | | Saponification conditions | | | | | |
|---|---|---|---|---|---|---|---|
| | PVAc concentration (%) | Alkali ratio (MR) | Temperature (° C.) | Time (hr) | Neutralization[1] | Washing[2] | PVA |
| Example 16 | 25 | 0.08 | 40 | 1 | ① | ② | PVA-16 |
| 17 | 50 | 0.01 | 40 | 1 | ② | ② | PVA-17 |
| 18 | 35 | 0.006 | 40 | 1 | ① | ① | PVA-18 |
| 19 | 30 | 0.10 | 60 | 1 | ① | ① | PVA-19 |
| 20 | 40 | 0.05 | 40 | 1 | ① | ② | PVA-20 |
| 21 | 40 | 0.015 | 40 | 1 | ① | ① | PVA-21 |
| 22 | 30 | 0.10 | 60 | 1 | ① | ② | PVA-22 |
| 23 | 35 | 0.10 | 60 | 2 | ① | ✕1 | PVA-23 |
| 24 | 35 | 0.10 | 60 | 2 | ① | ✕2 | PVA-24 |
| 25 | 40 | 0.10 | 60 | 1 | ① | ② | PVA-25 |
| 26 | 35 | 0.10 | 60 | 2 | ① | ② | PVA-26 |
| 27 | 30 | 0.03 | 40 | 1 | ① | ① | PVA-27 |
| 28 | 50 | 0.05 | 60 | 1 | ① | ① | PVA-28 |
| 29 | 30 | 0.04 | 40 | 1 | ① | ① | PVA-29 |

[1]①: Neutralized with methyl acetate, ②: neutralized with acetic acid solution in methanol, ③ not neutralized.
[2]①: Washed 3 times with methanol alone, ②: washed twice with a mixed solvent of water/methanol = 1/9 and then washed twice with methanol alone.
✕1: Washed with a mixed solvent of water/methanol = 3/7 and then washed with methanol alone.
✕2: Washed once with methanol alone.

TABLE 5

|  | PVA | Ratio of ethylene modification (mole %) | Polymerization degree | Degree of saponification (mole %) | Carboxyl group + lactone rings (mole %) | Melting point (° C.) | Amount of 1,2-glycol bond (mole %) | Molar ratio of OH of central vinyl alcohol unit in 3 successive vinyl alcohol unit chain (mole %) | Content of alkali metal[1] (part) |
|---|---|---|---|---|---|---|---|---|---|
| Example 1 | PVA-1 | 7 | 1,000 | 98.5 | 0.246 | 210 | 1.61 | 87 | 0.36 |
| 2 | PVA-2 | 10 | 500 | 99 | 0.054 | 211 | 1.53 | 84 | 0.09 |
| 3 | PVA-3 | 5 | 1,500 | 99.5 | 0.041 | 224 | 1.66 | 90 | 0.14 |
| 4 | PVA-4 | 12 | 1,000 | 95.5 | 0.302 | 183 | 1.48 | 76 | 0.33 |
| 5 | PVA-5 | 10 | 350 | 93 | 0.331 | 172 | 1.48 | 76 | 0.20[2] |
| 6 | PVA-6 | 3 | 500 | 97 | 0.277 | 207 | 1.66 | 88 | 0.25 |
| 7 | PVA-7 | 18 | 210 | 95 | 0.334 | 168 | 1.31 | 67 | 0.08 |
| 8 | PVA-8 | 13 | 300 | 98 | 0.267 | 196 | 1.46 | 78 | 0.01 |
| 9 | PVA-9 | 10 | 500 | 99 | 0.054 | 211 | 1.53 | 84 | 0.27 |
| 10 | PVA-10 | 10 | 500 | 99 | 0.054 | 211 | 1.53 | 84 | 0.01 |
| 11 | PVA-11 | 12 | 210 | 99.9 | 0.379 | 213 | 1.48 | 80 | 0.16 |
| 12 | PVA-12 | 3 | 1,500 | 98.5 | 0.031 | 230 | 1.73 | 95 | 0.31 |
| 13 | PVA-13 | 14 | 240 | 96 | 0.328 | 179 | 1.43 | 74 | 0.12 |
| 14 | PVA-14 | 5 | 210 | 99 | 0.025 | 223 | 1.49 | 91 | 0.18 |
| 15 | PVA-15 | 5 | 750 | 99 | 0.043 | 220 | 1.92 | 91 | 0.12 |

[1] Based on 100 parts by weight of PVA,
[2] In terms of Na.

TABLE 6

|  | PVA | Ratio of ethylene modification (mole %) | Polymerization degree | Degree of saponification (mole %) | Carboxyl group + lactone rings (mole %) | Melting point (° C.) | Amount of 1,2-glycol bond (mole %) | Molar ratio of OH of central vinyl alcohol unit in 3 successive vinyl alcohol unit chain (mole %) | Content of alkali metal[1] (part) | Others |
|---|---|---|---|---|---|---|---|---|---|---|
| Example 16 | PVA-16 | 6 | 1,850 | 98 | 0.043 | 208 | 1.58 | 87 | 0.03 | |
| 17 | PVA-17 | 8 | 350 | 88 | 0.029 | 166 | 1.51 | 72 | 0.005 | |
| 18 | PVA-18 | 7 | 500 | 83 | 0.153 | 161 | 1.61 | 70 | 0.19 | |
| 19 | PVA-19 | 10 | 750 | 98 | 0.060 | 161 | 1.53 | 82 | 0.33 | EVE 7 mole % |
| 20 | PVA-20 | 10 | 400 | 96 | 0.166 | 189 | 1.28 | 79 | 0.12 | |
| 21 | PVA-21 | 4 | 350 | 95 | 0.028 | 196 | 1.67 | 85 | 0.29 | |
| 22 | PVA-22 | 5 | 1,000 | 98 | 0.390 | 205 | 1.65 | 67 | 0.13 | |
| 23 | PVA-23 | 10 | 500 | 99 | 0.054 | 211 | 1.53 | 84 | 0.0005 | |
| 24 | PVA-24 | 10 | 500 | 99 | 0.054 | 211 | 1.53 | 84 | 0.98 | |
| 25 | PVA-25 | 8 | 400 | 98 | 0.058 | 192 | 1.58 | 85 | 0.03 | EVE 7 mole % |
| 26 | PVA-26 | 10 | 500 | 99 | 0.062 | 210 | 1.53 | 84 | 0.03 | VMS 0.2 mole % |
| 27 | PVA-27 | 10 | 900 | 96 | 0.059 | 185 | 1.53 | 78 | 0.38 | AMPS-NA 0.4 mole % |
| 28 | PVA-28 | 5 | 290 | 98.5 | 0.055 | 208 | 1.66 | 89 | 0.37 | MAPTAC 1 mole % |
| 29 | PVA-29 | 3 | 1,000 | 98 | 0.035 | 216 | 1.71 | 92 | 0.35 | |

[1] Based on 100 parts by weight of PVA.
[2] EVE: ethyl vinyl ether, VMS: vinyltrimethoxysilane, AMPS-NA: sodium 2-(N-acrylamide)-2-methylpropanesulfonate, MAPTAC: 3-(N-methacrylamide)propyltrimethylammonium chloride

TABLE 7

|  |  | Polymerization temperature (° C.) | VAc (kg) | MeOH (kg) | Ethylene pressure during polymerization (kg/cm²) | Delay | | | Initiator | | | Polymerization time (hr) | Conversion (%) |
|---|---|---|---|---|---|---|---|---|---|---|---|---|---|
|  |  |  |  |  |  | Type[1] | Amount fed initially (g) | Total amount fed (ml) | Type[2] | Amount fed initially (ml) | Rate of continuous addition (ml/hr) |  |  |
| Comparativ Example | 1 | 60 | 81.9 | 68.0 | — | MAn | 12.3 | 1,375 | AMV | 224 | 705 | 4 | 40 |
| | 2 | 60 | 57.5 | 92.5 | — | — | — | — | AMV | 471 | 1,484 | 5 | 60 |
| | 3 | 60 | 101.7 | 48.3 | — | — | — | — | AMV | 139 | 438 | 4 | 40 |
| | 4 | 60 | 45.4 | 104.6 | — | MAn | 8.1 | 1,353 | AMV | 321 | 1,009 | 7 | 65 |
| | 5 | 80 | 37.2 | 112.8 | — | — | — | — | AIBN | 282 | 139 | 4 | 30 |
| | 6 | 40 | 35.6 | 113.5 | — | — | — | — | AMV | 4,954 | 1,109 | 4 | 40 |
| | 7 | 60 | 76.5 | 73.4 | — | 3MPA | 4.5 | 1,677 | AMV | 459 | 1,445 | 5 | 60 |
| | 8 | 60 | 57.5 | 92.5 | — | AGE | 168 | — | AMV | 471 | 1,484 | 5 | 60 |
| | 9 | 60 | 57.5 | 92.5 | — | — | — | — | AMV | 471 | 1,484 | 5 | 60 |
| | 10 | 60 | 135.0 | 14.9 | 2.8[4] | iBu[3] | 11.1 | — | AMV | 220 | 694 | 4 | 20 |
| | 11 | 60 | 135.0 | 14.9 | — | nOct[3] | 7.0 | — | AMV | 612 | 1,929 | 5 | 40 |
| | 12 | 60 | 64.4 | 85.5 | 11.0 | MAn | 10.5 | 1,889 | AMV | 329 | 1,035 | 15 | 70 |

TABLE 7-continued

| | Polymerization temperature (° C.) | VAc (kg) | MeOH (kg) | Ethylene pressure during polymerization (kg/cm²) | Delay Type[1] | Delay Amount fed initially (g) | Delay Total amount fed (ml) | Initiator Type[2] | Initiator Amount fed initially (ml) | Initiator Rate of continuous addition (ml/hr) | Polymerization time (hr) | Conversion (%) |
|---|---|---|---|---|---|---|---|---|---|---|---|---|
| 13 | 60 | 142.2 | 7.7 | 5.4 | — | — | — | AMV | 197 | 621 | 3 | 25 |
| 14 | 60 | 31.6 | 118.3 | 2.9 | — | — | — | AMV | 302 | 949 | 3 | 25 |
| 15 | 60 | 78.0 | 72.0 | 6.5 | — | — | — | AMV | 163 | 513 | 4 | 25 |

[1] MAn: maleic anhydride, 3MPA: 3-mercaptopropionic acid, AGE: allyl glycidyl ether, iBu: iso-butene, nOct: 1-octene
[2] AMV: 2,2'-azobis(4-methoxy-2,4-dimethylvaleronitrile), AIBN: 2,2'-azobis(isobutyronitrile)
[3] The amount fed initially is in kg.
[4] inside pressure effected by iBu, of polymerization vessel

TABLE 8

| | | Polymerization temperature (° C.) | VAc (kg) | MeOH (kg) | Ethylene pressure during polymerization (kg/cm²) | Delay Type[1] | Delay Amount fed initially (g) | Delay Total amount fed (ml) | Initiator Type[2] | Initiator Amount fed initially (ml) | Initiator Rate of continuous addition (ml/hr) | Polymerization time (hr) | Conversion (%) |
|---|---|---|---|---|---|---|---|---|---|---|---|---|---|
| Comparative Example | 16 | 60 | 76.6 | 73.3 | 6.5 | IA | 8.5 | 1,440 | AMV | 175 | 552 | 3 | 20 |
| | 17 | 0 | 22.5 | 127.2 | 0.1 | — | — | — | NPP[3] | 402 | 1,446 | 10 | 75 |
| | 18 | 60 | 75.9 | 74.0 | 5.1 | EVE[4] | 7.95 | — | AMV | 438 | 1,378 | 10 | 70 |
| | 19 | 60 | 57.4 | 92.6 | — | — | — | — | AMV | 327 | 1,030 | 6 | 60 |
| | 20 | 20 | 55.9 | 93.6 | 5.8 | — | — | — | NPP[3] | 710 | 2,559 | 5 | 60 |
| | 21 | 100 | 91.9 | 58.1 | 3.2 | — | — | — | V-40 | 65 | 234 | 5 | 40 |
| | 22 | 60 | 76.6 | 73.3 | 6.5 | — | — | — | AMV | 175 | 552 | 3 | 20 |
| | 23 | 60 | 76.6 | 73.3 | 6.5 | — | — | — | AMV | 175 | 552 | 3 | 20 |
| | 24 | 60 | 81.8 | 68.1 | — | IA | 5.1 | 1,608 | AMV | 125 | 451 | 5 | 40 |
| | 25 | 60 | 32.2 | 117.7 | — | — | — | — | AMV | 243 | 875 | 10 | 75 |

[1] IA: itaconic acid, EVE: ethyl vinyl ether, AGE: allyl glycidyl ether
[2] AMV: 2,2'-azobis(4-methoxy-2,4-dimethylvaleronitrile), V-40: 1,1'-azobis(cyclohexane-1-carbonitrile)
[3] NPP: (n-propyl peroxydicarbonate)/N,N dimethylaniline = 1/1;
[4] The amount fed initially is in kg.

TABLE 3

| | | Saponification conditions PVAc concentration (%) | Alkali ratio (MR) | Temperature (° C.) | Time (hr) | Neutralization[1] | Washing[2] | PVA |
|---|---|---|---|---|---|---|---|---|
| Comparative Example | 1 | 30 | 0.025 | 40 | 1 | ① | ① | PVA-30 |
| | 2 | 35 | 0.05 | 40 | 1 | ① | ② | PVA-31 |
| | 3 | 25 | 0.06 | 60 | 1 | ③ | ② | PVA-32 |
| | 4 | 40 | 0.01 | 40 | 1 | ② | ① | PVA-33 |
| | 5 | 50 | 0.008 | 40 | 1 | ② | ① | PVA-34 |
| | 6 | 40 | 0.004 | 40 | 1 | ② | ① | PVA-35 |
| | 7 | 40 | 0.02 | 40 | 1 | ② | ① | PVA-36 |
| | 8 | 35 | 0.04 | 40 | 1 | ① | ① | PVA-37 |
| | 9 | 35 | 0.04 | 40 | 1 | ① | ② | PVA-38 |
| | 10 | 40 | 0.10 | 40 | 1 | ② | ② | PVA-39 |
| | 11 | 25 | 0.05 | 40 | 1 | ② | ① | PVA-40 |
| | 12 | 50 | 0.15 | 60 | 5 | ① | ① | PVA-41 |
| | 13 | 20 | 0.10 | 60 | 4 | ③ | ② | PVA-42 |
| | 14 | 60 | 0.10 | 60 | 3 | ① | ② | PVA-43 |
| | 15 | 40 | 0.002 | 40 | 1 | ② | ① | PVA-44 |

[1] ①: Neutralized with methyl acetate, ②: neutralized with acetic acid solution in methanol, ③ not neutralized.
[2] ①: Washed 3 times with methanol alone, ②: washed twice with a mixed solvent of water/methanol = 1/9 and then washed twice with methanol alone, ③ washed with acetic acid solution in methanol once and then washed 3 times with methanol alone.

TABLE 10

| | | Saponification conditions PVAc concentration (%) | Alkali ratio (MR) | Temperature (° C.) | Time (hr) | Neutralization[1] | Washing[2] | PVA |
|---|---|---|---|---|---|---|---|---|
| Comparative Example | 16 | 35 | 0.10 | 60 | 2 | ① | ② | PVA-45 |
| | 17 | 35 | 0.015 | 40 | 1 | ① | ① | PVA-46 |
| | 18 | 40 | 0.02 | 40 | 1 | ② | ① | PVA-47 |
| | 19 | 35 | 0.10 | 60 | 4 | ③ | ② | PVA-48 |
| | 20 | 35 | 0.10 | 60 | 1 | ① | ② | PVA-49 |
| | 21 | 35 | 0.015 | 40 | 1 | ① | ① | PVA-50 |
| | 22 | 35 | 0.10 | 60 | 2 | ① | ※1 | PVA-51 |
| | 23 | 35 | 0.10 | 60 | 2 | ① | ※2 | PVA-52 |
| | 24 | 30 | 0.01 | 40 | 1 | ① | ① | PVA-53 |
| | 25 | 50 | 0.10 | 60 | 2 | ③ | ② | PVA-54 |

[1] ①: Neutralized with methyl acetate, ②: neutralized with acetic acid solution in methanol, ③ not neutralized.
[2] ①: Washed 3 times with methanol alone, ②: washed twice with a mixed solvent of water/methanol = 1/9 and then washed twice with methanol alone.
※1: Washed 3 times with a mixed solvent of water/methanol = 3/7 and then washed with methanol alone.
※2: Washed once with methanol alone (standing time: 1 hr).

TABLE 11

| | | PVA | Ratio of ethylene modification (mole %) | Polymerization degree | Degree of saponification (mole %) | Carboxyl group + lactone rings (mole %) | Melting point (° C.) | Amount of 1,2-glycol bond (mole %) | Molar ratio of OH of central vinyl alcohol unit in 3 successive vinyl alcohol unit chain (mole %) | Content of alkali metal[1] (part) | Others |
|---|---|---|---|---|---|---|---|---|---|---|---|
| Comparative Example | 1 | PVA-30 | 0 | 1,000 | 98.5 | 0.247 | 224 | 1.78 | 98 | 0.30 | |
| | 2 | PVA-31 | 0 | 500 | 99 | 0.048 | 228 | 1.78 | 99 | 0.09 | |
| | 3 | PVA-32 | 1 | 1,500 | 99.5 | 0.040 | 230 | 1.75 | 94 | 0.12 | |
| | 4 | PVA-33 | 0 | 350 | 93 | 0.294 | 193 | 1.76 | 92 | 0.17 | |
| | 5 | PVA-34 | 0 | 250 | 88 | 0.035 | 182 | 1.74 | 88 | 0.25 | |
| | 6 | PVA-35 | 0 | 450 | 83 | 0.020 | 183 | 1.72 | 88 | 0.18 | |
| | 7 | PVA-36 | 0 | 300 | 98 | 0.353 | 220 | 1.77 | 98 | 0.30 | |
| | 8 | PVA-37 | 0 | 500 | 99 | 0.048 | 228 | 1.78 | 99 | 0.27 | |
| | 9 | PVA-38 | 0 | 500 | 99 | 0.048 | 227 | 1.78 | 99 | 0.02 | |
| | 10 | PVA-39 | 0 | 400 | 98.5 | 0.062 | 165 | 1.57 | 83 | 0.17 | iBu 8 mole % |
| | 11 | PVA-40 | 0 | 1,000 | 98.5 | 0.037 | 211 | 1.72 | 92 | 0.30 | nOct 2 mole % |
| | 12 | PVA-41 | 22 | 210 | 99 | 0.107 | 190 | 1.33 | 67 | 0.13 | |
| | 13 | PVA-42 | 5 | 2,400 | 99.5 | 0.041 | 223 | 1.65 | 88 | 0.14 | |
| | 14 | PVA-43 | 10 | 160 | 99 | 0.055 | 211 | 1.53 | 83 | 0.07 | |
| | 15 | PVA-44 | 10 | 500 | 75 | 0.055 | 141 | 1.45 | 62 | 0.06 | |

[1] Based on 100 parts by weight of PVA.
[2] iBu: iso-butene, nOct: 1-octene.

TABLE 12

| | | PVA | Ratio of ethylene modification (mole %) | Polymerization degree | Degree of saponification (mole %) | Carboxyl group + lactone rings (mole %) | Melting point (° C.) | Amount of 1,2-glycol bond (mole %) | Molar ratio of OH of central vinyl alcohol unit in 3 successive vinyl alcohol unit chain (mole %) | Content of alkali metal[1] (part) | Others |
|---|---|---|---|---|---|---|---|---|---|---|---|
| Comparative Example | 16 | PVA-45 | 10 | 500 | 99 | 0.554 | 209 | 1.64 | 82 | 0.09 | |
| | 17 | PVA-46 | 3 | 500 | 97 | 0.016 | 205 | 1.69 | 89 | 0.24 | |
| | 18 | PVA-47 | 10 | 350 | 93 | 0.071 | 141 | 1.51 | 76 | 0.21 | EVE 5 mole % |
| | 19 | PVA-48 | 0 | 500 | 99.95 | 0.033 | 235 | 1.78 | 99 | 0.28 | |
| | 20 | PVA-49 | 10 | 500 | 98.5 | 0.043 | 207 | 1.02 | 85 | 0.71 | |
| | 21 | PVA-50 | 3 | 500 | 97 | 0.071 | 205 | 2.10 | 89 | 0.45 | |
| | 22 | PVA-51 | 10 | 500 | 99 | 0.054 | 211 | 1.78 | 84 | 0.0001 | |
| | 23 | PVA-52 | 10 | 500 | 99 | 0.054 | 211 | 1.78 | 84 | 1.2 | |
| | 24 | PVA-53 | 0 | 1,000 | 95.5 | 0.307 | 210 | 1.76 | 94 | 0.25 | |
| | 25 | PVA-54 | 0 | 210 | 99.5 | 0.039 | 232 | 1.77 | 99 | 0.12 | |

[1] Based on 100 parts by weight of PVA.
[2] EVE: ethyl vinyl ether

TABLE 13

| | PVA | Water-solubility | Water resistance[1] 50° C. | Water resistance[1] 120° C. | Viscosity stability η-1 day/η-initial |
|---|---|---|---|---|---|
| Example 30 | PVA-1 | 5 | 5 | 5 | 1.1 |
| 31 | PVA-2 | 5 | 5 | 5 | 1.3 |
| 32 | PVA-3 | 5 | 5 | 5 | 5.9 |
| 33 | PVA-4 | 4 | 4 | 5 | 1.1 |
| 34 | PVA-5 | 4 | 4 | 4 | 1.1 |
| 35 | PVA-6 | 5 | 4 | 5 | 2.6 |
| 36 | PVA-7 | 4 | 5 | 5 | 1.0 |
| 37 | PVA-8 | 5 | 5 | 5 | 1.1 |
| 38 | PVA-9 | 5 | 5 | 5 | 1.4 |
| 39 | PVA-10 | 5 | 5 | 5 | 1.3 |
| 40 | PVA-11 | 5 | 5 | 5 | 24.5 |
| 41 | PVA-12 | 5 | 5 | 5 | 9.5 |
| 42 | PVA-13 | 4 | 5 | 5 | 1.1 |
| 43 | PVA-14 | 5 | 5 | 5 | 4.5 |
| 44 | PVA-15 | 5 | 5 | 5 | 4.3 |

[1] "50° C.": films not heat treated. "120° C.": films heat treated at 120° C. for 10 minutes.

TABLE 14

| | PVA | Water-solubility | Water resistance[1] 50° C. | Water resistance[1] 120° C. | Viscosity stability η-1 day/η-initial |
|---|---|---|---|---|---|
| Example 45 | PVA-16 | 5 | 5 | 5 | 2.2 |
| 46 | PVA-17 | 4 | 3 | 4 | 1.0 |
| 47 | PVA-18 | 4 | 3 | 4 | 1.0 |
| 48 | PVA-19 | 5 | 5 | 5 | 1.0 |
| 49 | PVA-20 | 5 | 5 | 5 | 1.1 |
| 50 | PVA-21 | 5 | 4 | 5 | 1.0 |
| 51 | PVA-22 | 5 | 5 | 5 | 2.1 |
| 52 | PVA-23 | 5 | 5 | 5 | 1.4 |
| 53 | PVA-24 | 5 | 5 | 5 | 1.5 |
| 54 | PVA-25 | 5 | 3 | 4 | 1.0 |
| 55 | PVA-26 | 5 | 5 | 5 | 1.5 |
| 56 | PVA-27 | 5 | 5 | 5 | 1.1 |
| 57 | PVA-28 | 5 | 3 | 4 | 1.0 |
| 58 | PVA-29 | 5 | 5 | 5 | 2.4 |

[1] "50° C.": films not heat treated. "120° C.": films heat treated at 120° C. for 10 minutes.

TABLE 15

| PVA | Water-solubility | Water resistance[1] 50° C. | Water resistance[1] 120° C. | Viscosity stability η-1 day/η-initial |
|---|---|---|---|---|
| Comparative Example 26 PVA-30 | 5 | 3 | 4 | gelled |
| 27 PVA-31 | 5 | 3 | 4 | gelled |
| 28 PVA-32 | 5 | 3 | 4 | gelled |
| 29 PVA-33 | 5 | 1 | 2 | 1.11 |
| 30 PVA-34 | 5 | 1 | 1 | 1.00 |
| 31 PVA-35 | 5 | 1 | 1 | 1.05 |
| 32 PVA-36 | 5 | 3 | 4 | 23.89 |
| 33 PVA-37 | 5 | 3 | 4 | gelled |
| 34 PVA-38 | 5 | 3 | 4 | gelled |
| 35 PVA-39 | 1 | 2 | 2 | — |
| 36 PVA-40 | 1 | 2 | 2 | — |
| 37 PVA-41 | 1 | 5 | 5 | 1.13 |
| 38 PVA-42 | 5 | 5 | 5 | gelled |
| 39 PVA-43 | 5 | 3 | 4 | partly gelled |
| 40 PVA-44 | 2 | 1 | 1 | — |

[1])"50° C.": films not heat treated. "120° C.": films heat treated at 120° C. for 10 minutes.

TABLE 16

| PVA | Water-solubility | Water resistance[1] 50° C. | Water resistance[1] 120° C. | Viscosity stability η-1 day/η-initial |
|---|---|---|---|---|
| Comparative Example 41 PVA-45 | 5 | 3 | 4 | 1.3 |
| 42 PVA-46 | 5 | 2 | 4 | 2.5 |
| 43 PVA-47 | 5 | 2 | 3 | 1.2 |
| 44 PVA-48 | 5 | 4 | 5 | gelled |
| 45 PVA-49 | 5 | 3 | 4 | 1.7 |
| 46 PVA-50 | 5 | 2 | 4 | 2.2 |
| 47 PVA-51 | 5 | 3 | 4 | 2.1 |
| 48 PVA-52 | 5 | 3 | 4 | 1.4 |
| 49 PVA-53 | 5 | 3 | 4 | 1.9 |
| 50 PVA-54 | 5 | 3 | 4 | partly gelled |

[1])"50° C.": films not heat treated. "120° C.": films heat treated at 120° C. for 10 minutes.

[Melt Moldability of ethylene-modified PVA]

Examples 59 through 78 and Comparative Examples 51 through 67

PVA pellets were produced under any one of the following molding temperature conditions, and they were evaluated for melt moldability during molding. The results of evaluation were reported in terms of the following 5-stage rating, and shown in Table 17 through Table 19.

Pelletization Conditions

Extruder: Laboplastmil made by Toyo Seikan Co., Ltd.
Screw: same-direction twin-screw; 25 mmφ, L/D=26
Throughput: 3.0 kg/hr (Pelletization Temperature Conditions A)

Temperature set for cylinder: 230° C.
Temperature set for die: 130° C.

(Pelletization Temperature Conditions B)

Temperature set for cylinder: 210° C.
Temperature set for die: 120° C.

(Pelletization Temperature Conditions C)

Temperature set for cylinder: 200° C.
Temperature set for die: 110° C.

Rating of the Results of Evaluation for Melt Moldability

5: No fuming at all during molding, and no smell due to resin decomposition.

4: No serious fuming during molding, and no smell due to resin decomposition.

3: Some fuming during molding, and some smell due to resin decomposition.

2: Considerable fuming during molding, and smell due to resin decomposition.

1: Serious fuming during molding, and serious smell due to decomposition; molding is impossible. Or, the resin, having too high a melting point, contains a large amount of undissolved matter and is hence unusable for molding.

[Thermal Stability of ethylene-modified PVA]

Examples 59 through 78, and Comparative Examples 51 through 67

Melt extrusion molding was conducted by using the pellets obtained above as raw materials and under any one of the following molding temperature conditions, to obtain films. The obtained films were evaluated for the thermal stability of the polymers used. The results of evaluation were reported in terms of the following 5-stage rating, and are shown in Table 17 through Table 19.

Melt Extrusion Molding Conditions

Extruder: Laboplastmil made by Toyo Seikan Co., Ltd.
Screw: Full-flight type
Screw rotation: 200 rpm
Motor load current: 3.3 A
Throughput: 2.2 kg/hr
Film thickness: 40 μm (Extrusion Molding Temperature Conditions A)

Cylinder 1: 180° C.
Cylinder 2: 210° C.
Cylinder 3: 230° C.
Cylinder 4: 230° C.
Cylinder 5: 230° C.
Die: 225° C.

(Extrusion Molding Temperature Conditions B)

Cylinder 1: 160° C.
Cylinder 2: 190° C.
Cylinder 3: 210° C.
Cylinder 4: 210° C.
Cylinder 5: 210° C.
Die: 205° C.

(Extrusion Molding Temperature Conditions C)

Cylinder 1: 150° C.
Cylinder 2: 180° C.
Cylinder 3: 200° C.
Cylinder 4: 200° C.
Cylinder 5: 200° C.
Die: 195° C.

Evaluation for Thermal Stability of Polymer

From each of the films obtained above, 20 specimens having a width and length of both 200 mm were cut at random. The number per film of unmelted lumps originating from gel was counted and the average of 20 films was taken. The thermal stability was evaluated in terms of the following rating.

5: Number of unmelted lumps is less than 0.2

4: Number of unmelted lumps is 0.2 or more and less than 0.6

3: Number of unmelted lumps is 0.6 or more and less than 1.5

2: Number of unmelted lumps is 1.5 or more and less than 4.0

1: Number of unmelted lumps is 4.0 or more

[Properties of Injection Molded Product of ethylene-modified PVA]

Examples 59 through 78, and Comparative Examples 51 through 67

Injection molding was conducted by using the pellets obtained above as raw materials and under any one of the following molding temperature conditions, to obtain test pieces having a width, length and thickness of 50 mm, 100 mm and 3 mm, respectively. The test pieces were measured for the modulus of flexural elasticity. The results are shown in Table 17 through Table 19.

Injection Molding Conditions

Molding machine: FS80S12ASEE made by Nissei Jushi Kogyo Co., Ltd.

Injection capacity: 127 cm3/shot

Clamping force: 80 tons

Die temperature: 60° C.

Injection pressure:
(primary) 950 kgf/cm2
(secondary) 560 kgf/cm2
(tertiary) 400 kgf/cm2

Screw back-pressure: 10 kgf/cm2

Injection time: 10 seconds

Cooling time: 40 seconds (Injection Molding Temperature Conditions A)

Cylinder (rear): 220° C.

Cylinder (middle): 235° C.

Cylinder (front): 235° C.

Nozzle: 230° C.

(Injection Molding Temperature Conditions B)

Cylinder (rear): 200° C.

Cylinder (middle): 215° C.

Cylinder (front): 215° C.

Nozzle: 210° C.

(Injection Molding Temperature Conditions C)

Cylinder (rear): 190° C.

Cylinder (middle): 205° C.

Cylinder (front): 205° C.

Nozzle: 200° C.

Determination of the Modulus of Flexural Elasticity

Determined in accordance with JIS-K7203.

[Properties of Blow Molded Product of ethylene-modified PVA]

Examples 59 through 78, and Comparative Examples 51 through 67

Blow molding was conducted by using the pellets obtained above as raw materials and under any one of the following molding temperature conditions, to obtain bottles. The obtained bottles were evaluated for shock resistance, and the results were reported in terms of the following 5-stage rating. The results are shown in Table 17 through Table 19.

Blow Molding Conditions

Molding machine: Blow molding machine made by Suzuki Iron Works

Screw: 40φ, L/D=19

Screw rotation: 500 rpm

Die/nozzle: 13φ/160φ

Bottle capacity: 50 ml (wall thickness: 0.85 mm)

(Blow Molding Temperature Conditions A)

Cylinder 1: 210° C.

Cylinder 2: 225° C.

Cylinder 3: 230° C.

Cylinder 4: 230° C.

Cylinder 5: 230° C.

Die: 225° C.

(Blow Molding Temperature Conditions B)

Cylinder 1: 190° C.

Cylinder 2: 205° C.

Cylinder 3: 210° C.

Cylinder 4: 210° C.

Cylinder 5: 210° C.

Die: 205° C.

(Blow Molding Temperature Conditions C)

Cylinder 1: 180° C.

Cylinder 2: 195° C.

Cylinder 3: 200° C.

Cylinder 4: 200° C.

Cylinder 5: 200° C.

Die: 195° C.

Evaluation for Shock Resistance

The bottles were completely filled with an antifreeze of a lubrication oil (coagulating point: −20° C.) and sealed. The bottles were kept standing for one week (at 20° C., 65% RH; or at −5° C.) or for one month (at −5° C.). The bottles (20 bottles for each sample) were then, as they were filled with the oil, allowed to fall from a height of 2.5 m on to wooden floor. The number of cracks generated on the bottles were counted and averages taken, and the shock resistance was evaluated in terms of the following rating.

5: Number of cracks is 1 or less

4: Number of cracks is 2 to 4

3: Number of cracks is 5 to 7

2: Number of cracks is 8 to 10

1: Number of cracks is 11 or more

TABLE 17

| Example | PVA | Melt moldability Molding temperature condition | Evaluation | Thermal stability Molding temperature condition | Evaluation | Test piece property Molding temperature condition | Modulus of elasticity (kgf/mm$^2$) | Shock resistance of bottle Molding temperature condition | 1 week at 20° C. 65% RH | 1 week at −5° C. | 1 month at −5° C. |
|---|---|---|---|---|---|---|---|---|---|---|---|
| 59 | PVA-1* | A | 4 | A | 5 | A | 373 | A | 5 | 5 | 5 |
| 60 | PVA-2 | A | 5 | A | 5 | A | 529 | A | 5 | 5 | 5 |
| 61 | PVA-4* | A | 4 | A | 4 | A | 356 | A | 5 | 5 | 5 |
| 62 | PVA-5 | C | 5 | C | 5 | C | 471 | C | 5 | 5 | 4 |
| 63 | PVA-6 | A | 5 | A | 5 | A | 504 | A | 5 | 5 | 5 |
| 64 | PVA-7 | C | 5 | C | 5 | C | 517 | C | 5 | 5 | 4 |
| 65 | PVA-8 | B | 5 | B | 4 | B | 528 | B | 5 | 5 | 4 |
| 66 | PVA-9 | A | 5 | A | 5 | A | 521 | A | 5 | 5 | 5 |
| 67 | PVA-10 | A | 5 | A | 5 | A | 525 | A | 5 | 5 | 5 |
| 68 | PVA-11 | A | 5 | A | 4 | A | 532 | A | 5 | 5 | 4 |

*15 parts of glycerine was added to 100 parts of PVA.

TABLE 18

| Example | PVA | Melt moldability Molding temperature condition | Evaluation | Thermal stability Molding temperature condition | Evaluation | Test piece property Molding temperature condition | Modulus of elasticity (kgf/mm$^2$) | Shock resistance of bottle Molding temperature condition | 1 week at 20° C. 65% RH | 1 week at −5° C. | 1 month at −5° C. |
|---|---|---|---|---|---|---|---|---|---|---|---|
| 69 | PVA-14 | A | 5 | A | 5 | A | 491 | A | 5 | 4 | 4 |
| 70 | PVA-17 | C | 4 | C | 4 | C | 376 | C | 5 | 5 | 4 |
| 71 | PVA-19 | C | 5 | C | 5 | C | 382 | C | 5 | 5 | 5 |
| 72 | PVA-20 | B | 4 | B | 4 | B | 483 | B | 5 | 4 | 4 |
| 73 | PVA-21 | B | 4 | B | 4 | B | 455 | B | 5 | 5 | 4 |
| 74 | PVA-23 | A | 5 | A | 4 | A | 547 | A | 5 | 4 | 4 |
| 75 | PVA-24 | A | 4 | A | 4 | A | 524 | A | 5 | 4 | 4 |
| 76 | PVA-25 | B | 5 | B | 4 | B | 428 | B | 5 | 5 | 5 |
| 77 | PVA-26 | A | 5 | A | 4 | A | 559 | A | 5 | 5 | 5 |
| 78 | PVA-27* | B | 4 | B | 4 | B | 289 | B | 5 | 5 | 5 |

*15 parts of glycerine was added to 100 parts of PVA.

TABLE 19

| Comparative Example | PVA | Melt moldability Molding temperature condition | Evaluation | Thermal stability Molding temperature condition | Evaluation | Test piece property Molding temperature condition | Modulus of elasticity (kgf/mm$^2$) | Shock resistance of bottle Molding temperature condition | 1 week at 20° C. 65% RH | 1 week at −5° C. | 1 month at −5° C. |
|---|---|---|---|---|---|---|---|---|---|---|---|
| 51 | PVA-30* | A | 2 | A | 2 | A | 273 | A | 4 | 2 | 1 |
| 52 | PVA-31 | A | 1 | — | — | — | — | — | — | — | — |
| 53 | PVA-33 | B | 1 | B | 1 | B | 409 | B | 4 | 2 | 1 |
| 54 | PVA-34 | B | 1 | B | 1 | B | 342 | B | 3 | 2 | 1 |
| 55 | PVA-36 | A | 2 | A | 1 | A | 436 | A | 2 | 1 | 1 |
| 56 | PVA-43 | A | 5 | A | 5 | A | 292 | A | 1 | 1 | 1 |
| 57 | PVA-44 | C | 1 | C | 1 | C | 235 | C | 4 | 3 | 3 |
| 58 | PVA-45 | A | 3 | A | 2 | A | 418 | A | 3 | 2 | 2 |
| 59 | PVA-46 | A | 3 | A | 2 | A | 416 | A | 3 | 2 | 2 |
| 60 | PVA-47 | C | 4 | C | 2 | C | 132 | C | 5 | 5 | 5 |
| 61 | PVA-48 | A | 1 | — | — | — | — | — | — | — | — |
| 62 | PVA-49 | A | 4 | A | 2 | A | 474 | A | 3 | 2 | 2 |
| 63 | PVA-50 | A | 3 | A | 2 | A | 415 | A | 3 | 2 | 2 |
| 64 | PVA-51 | A | 4 | A | 2 | A | 432 | A | 3 | 2 | 2 |
| 65 | PVA-52 | A | 1 | A | 2 | A | 381 | A | 3 | 2 | 2 |
| 66 | PVA-53* | A | 1 | A | 1 | A | 268 | A | 3 | 2 | 2 |
| 67 | PVA-54 | A | 1 | — | — | — | — | — | — | — | — |

*15 parts of glycerine was added to 100 parts of PVA.

Comparative Examples 52, 61 and 67

With respect to the melt moldability of completely saponified PVAs modified with less than the specified amount of ethylene, since the polymers had high melting points when no plasticizer had been added, unmelted PVA remained, at 230° C., in a large amount in pellets, which were not usable for melt molding.

Comparative Examples 53, 54 and 57

Medium-wise and partially saponified PVAs modified with less than the specified amount of ethylene were all poor in melt moldability and thermal stability, thereby giving seriously colored pellets and melt molded films. The obtained films contained a very large number of unmelted lumps and were hence unusable for practical purposes.

The PVA with its degree of saponification less than the specified range were, although modified with the specified amount of ethylene, also poor both in melt moldability and thermal stability and hence unusable for practical purposes.

Comparative Example 56

The PVA having a polymerization degree less than the specified range was, even if it had been modified with ethylene in the specified amount and saponified to the specified degree, markedly poor in the shock resistance of molded articles and hence unsatisfactory for practical purposes.

Comparative Examples 58 and 59

The PVAs having carboxyl group and lactone rings in a total amount outside the specified range were poor in melt moldability and thermal stability and gave melt molded films having a very large number of unmelted lumps thereby being unusable for practical purposes.

Comparative Example 60

The PVA having a melting point below the specified range, which had good shock resistance though, was poor, on injection molding or the like, in releasability from mold. This is not preferred in view of productivity of molded products. Furthermore, the obtained molded articles were poor in dimensional stability. As a result, for example molded bottles cause problem in practical use, and melted films tend to undergo blocking, thereby having poor utility.

Comparative Examples 62 and 63

The PVA having 1,2-glycol bond in an amount less than the specified range easily gelled, to give a melt molded film containing a large number of unmelted lumps, and was unusable for practical purposes.

Comparative Examples 64 and 65

The PVA containing an alkali metal in an amount exceeding the specified range caused serious smell due to decomposition and, moreover, tended to gel, thus proving to be markedly poor in melt moldability and thermal stability, which is not desirable for practical purposes.

In summary, those PVAs with their constituents in amounts deviating from the range specified in the present invention are poor in melt moldability and thermal stability and give molded articles such as bottles which tend to have poor shock resistance and poor color and transparency, so that these PVAs are not suitable for melt molding uses.

[Oxygen-barrier Property of ethylene-modified PVA]

Examples 79 through 95, and Comparative Examples 68 through 73 and 75 through 85

Onto distilled water placed in a separable flask, each of the PVAs shown in Table 20 and Table 21 was, with stirring, gradually added and dispersed therein uniformly. The dispersions were heated at 95° C. and stirred for at least 2 hours, to dissolve the PVAs completely. The solutions were allowed to cool to about 50° C. and, after filtration, further allowed to cool to room temperature, to give aqueous PVA solutions having concentrations as shown in Table 20 and Table 21.

Base films as shown in Table 20 and Table 21 and having a thickness of 15 $\mu$m were each coated at 50° C. with each of the PVA solutions thus obtained by using an applying bar and, after being dried at 120° C., heat treated in air at a temperature as shown in Table 20 and Table 21 for 120 seconds. The PVA coating layer had a thickness of 4.0 $\mu$m. The oxygen transmission rates (OTR) (unit: cc/m$^2$.day.atm) of the thus prepared PVA-coated films (laminates of the base film and PVA layer) are shown in Table 20 and Table 21. The oxygen transmission rate (OTR) (unit: cc/m$^2$.day.atm) of the PVA-coated films (laminates of the base film and PVA layer) was determined after the laminates had been conditioned at a temperature of 20° C. and a relative humidity of 80% for 5 days. The oxygen transmission rates shown in the Tables are converted values based on the thicknesses of the PVA layers having been converted into 20 $\mu$m.

Examples 96 through 100, and Comparative Examples 86 and 87

Aqueous PVA solutions having concentrations as shown in Table 20 and Table 21 were prepared in just the same manner as in Example 79. OPET base films having a thickness of 15 $\mu$m were coated with each of the thus prepared PVA solutions at 50° C. by using an applying bar and, after being dried at 130° C., heat treated in air at temperatures as shown in Table 20 and Table 21 for 120 seconds. The PVA coating layer had a thickness of 3 $\mu$m. The oxygen transmission rates of the obtained laminates are shown in Table 20 and Table 21.

The PVAs used in Comparative Examples 68 through 73, having carboxyl group and lactone rings but containing no or only a small amount of ethylene units gave laminates having poor oxygen-barrier property. The laminate obtained in Comparative Example 75 with use of an ethylene-modified PVA having a high polymerization degree, and that in Comparative Example 76 with use of another ethylene-modified PVA having a low polymerization degree had both slightly roughened surface on the PVA coating layer side. The laminate obtained in Comparative Example 77 with use of an ethylene-modified PVA having a low molar ratio, based on vinyl alcohol units, of a hydroxyl group of vinyl alcohol unit located at the center of 3 successive vinyl alcohol unit chain in terms of triad expression, the laminates in Comparative Examples 78 and 79 with use of ethylene-modified PVAs having carboxyl group and lactone rings in a total amount deviating from the specified range, and the laminates in Comparative Examples 77 and 80 through 84 with use of ethylene-modified PVAs having contents of 1,2-glycol bond and alkali metal deviating from the specified ranges, all gave laminates having poor oxygen-barrier property.

Comparative Example 74

Example 79 was repeated except that a water/methanol= 7/3 mixed solvent was used to prepare an aqueous solution, because the PVA used (PVA-39) was insoluble in water, to obtain a laminate. The oxygen transmission rate of the laminate is shown in Table 21. The result shows that the PVA modified with 1-octene instead of ethylene is poor in oxygen-barrier property.

Comparative Example 88

Example 79 was repeated except that a PVA film obtained by casting the aqueous PVA solution was, with an isocyanate-based adhesive, dry laminated on a base film as shown in Table 21 and having a thickness of 15 μm, to obtain a laminate. The PVA coating layer had a thickness of 2.0 μm. The result shows that the laminate obtained by dry lamination is poor in oxygen-barrier property compared to those obtained by aqueous solution coating.

TABLE 20

| | | Concentration of aqueous PVA solution for coating (%) | Laminate | | | | |
|---|---|---|---|---|---|---|---|
| Example | PVA | | Base film Name[1] | Use of anchor-coat agent | Heat treatment temperature (° C.) | Method of lamination | Oxygen transmission rate (cc/m$^2$ · day · atom) |
| 79 | PVA-1 | 10 | OPP | Yes | 130 | Aqueous solution coating | 8.2 |
| 80 | PVA-2 | 14 | " | " | 130 | Aqueous solution coating | 3.9 |
| 81 | PVA-3 | 7 | " | " | 130 | Aqueous solution coating | 5.1 |
| 82 | PVA-8 | 16 | " | " | 130 | Aqueous solution coating | 9.5 |
| 83 | PVA-9 | 14 | " | " | 130 | Aqueous solution coating | 4.1 |
| 84 | PVA-10 | 14 | " | " | 130 | Aqueous solution coating | 3.4 |
| 85 | PVA-11 | 16 | " | " | 130 | Aqueous solution coating | 7.5 |
| 86 | PVA-12 | 16 | " | " | 130 | Aqueous solution coating | 7.4 |
| 87 | PVA-14 | 16 | " | " | 130 | Aqueous solution coating | 5.9 |
| 88 | PVA-15 | 10 | " | " | 130 | Aqueous solution coating | 9.2 |
| 89 | PVA-16 | 7 | " | " | 130 | Aqueous solution coating | 5.4 |
| 90 | PVA-22 | 10 | " | " | 130 | Aqueous solution coating | 8.9 |
| 91 | PVA-23 | 14 | " | " | 130 | Aqueous solution coating | 2.8 |
| 92 | PVA-24 | 14 | " | " | 130 | Aqueous solution coating | 7.4 |
| 93 | PVA-26 | 14 | " | " | 130 | Aqueous solution coating | 2.3 |
| 94 | PVA-29 | 10 | " | " | 130 | Aqueous solution coating | 7.9 |
| 95 | PVA-2 | 14 | ON | No | 150 | Aqueous solution coating | 2.5 |
| 96 | PVA-2 | 14 | OPET | Yes | 130 | Aqueous solution coating | 3.7 |
| 97 | PVA-1 | 10 | " | " | 150 | Aqueous solution coating | 4.9 |
| 98 | PVA-4 | 10 | " | " | 170 | Aqueous solution coating | 8.9 |
| 99 | PVA-10 | 14 | " | " | 170 | Aqueous solution coating | 1.1 |
| 100 | PVA-26 | 14 | " | " | 170 | Aqueous solution coating | 0.7 |

[1]OPP: biaxially stretched polypropylene film, ON: biaxially stretched nylon film, OPET: biaxially stretched polyethylene terephthalate film

TABLE 21

| Comparative Example | PVA | Concentration of aqueous PVA solution for coating (%) | Base film Name[1] | Use of anchor-coat agent | Heat treatment temperature (° C.) | Method of lamination | Oxygen transmission rate (cc/m$^2$ · day · atom) |
|---|---|---|---|---|---|---|---|
| 68 | PVA-30 | 10 | OPP | Yes | 130 | Aqueous solution coating | 56 |
| 69 | PVA-31 | 14 | " | " | 130 | Aqueous solution coating | 41 |
| 70 | PVA-32 | 7 | " | " | 130 | Aqueous solution coating | 32 |
| 71 | PVA-36 | 16 | " | " | 130 | Aqueous solution coating | 61 |
| 72 | PVA-37 | 14 | " | " | 130 | Aqueous solution coating | 45 |
| 73 | PVA-38 | 14 | " | " | 130 | Aqueous solution coating | 36 |
| 74 | PVA-40 | 10 | " | " | 130 | Aqueous solution coating | >1,000 |
| 75 | PVA-42 | 7 | " | " | 130 | Aqueous solution coating | 25 |
| 76 | PVA-43 | 16 | " | " | 130 | Aqueous solution coating | 18 |
| 77 | PVA-44 | 14 | " | " | 130 | Aqueous solution coating | >1,000 |
| 78 | PVA-45 | 14 | " | " | 130 | Aqueous solution coating | 21 |
| 79 | PVA-46 | 14 | " | " | 130 | Aqueous solution coating | 49 |
| 80 | PVA-48 | 14 | " | " | 130 | Aqueous solution coating | 31 |
| 81 | PVA-49 | 14 | " | " | 130 | Aqueous solution coating | 18 |
| 82 | PVA-50 | 14 | " | " | 130 | Aqueous solution coating | 83 |
| 83 | PVA-51 | 14 | " | " | 130 | Aqueous solution coating | 15 |
| 84 | PVA-52 | 14 | " | " | 130 | Aqueous solution coating | 24 |
| 85 | PVA-30 | 10 | ON | No | 150 | Aqueous solution coating | 29 |
| 86 | PVA-53 | 10 | OPET | Yes | 170 | Aqueous solution coating | 67 |
| 87 | PVA-30 | 10 | " | " | 170 | Aqueous solution coating | 18 |
| 88 | PVA-1 | 10 | OPP | " | 130 | Dry lamination | 41 |

*A water/methanol = 7/3 mixed solvent was used.
[1])OPP: biaxially stretched polypropylene film, ON: biaxially stretched nylon film, OPET: biaxially stretched polyethylene terephthalate film (Biodegradability of ethylene-modified PVA]

Example 101

A continuous waste water treatment testing apparatus comprising a 5-l (liter) aeration tank and a 2-l (liter) sedimentation tank was used and an ethylene-modified PVA having carboxyl group and lactone rings was evaluated for biodegradability. After the PVA-1 shown in Table 5 had been dissolved in water, the PVA-1, glucose, L-glutamic acid, ammonium chloride, potassium chloride, potassium dihydrogenphosphate, dipotassium hydrogenphosphate, calcium chloride, iron sulfate and magnesium sulfate were dissolved in water in concentrations of 700, 360, 180, 120, 8.4, 300, 300, 6.7, 1.5 and 0.7 mg/l, respectively. After the pH of the solution had been adjusted to 7 with sodium hydroxide, the solution was sterilized and used as a culture medium. Sludge of a sewage treatment plant was used and the initial sludge concentration was adjusted to 4,400 ppm. The medium was fed to the aeration tank at a rate of 5 l (liter)/day, with an aeration rate of 2 l (liter)/day, and the liquid overflown from the aeration tank was transferred to the sedimentation tank and, after separation of precipitates there, fed as returned sludge to the aeration tank. After this treatment test had been performed continuously at 30° C. for 3 days, suspended sludge was sampled with a pipet from the central part of the aeration tank. The sample was then subjected to centrifugal separation. The PVA concentration of the supernatant was tested by the iodine method, to show 4.1 ppm. This result means that 99.4% of the PVA had been biodecomposed by the 3-day activated sludge treatment.

Examples 102 through 109, and Comparative Examples 89 through 94

Example 101 was repeated except that the PVAs shown in Table 22 were used instead of the PVA used in Example 101, to evaluate the biodegradability of the PVAs having carboxyl group and lactone rings. The concentrations and biodegrad-abilities of the PVAs in the sludge liquid after the 3-day treatment are shown in Table 22. As is understood from Table 22, the ethylene-modified PVAs having carboxyl group and lactone rings according to the present invention showed a biodegradability of at least 97% after a short period of only 3 days. On the other hand, PVAs deviating from the present invention showed a biodegradability of not more than 94% and those containing no ethylene showed one of not more than 80%.

Obviously, numerous modifications and variations of the invention are possible in light of the above teachings. It is therefore to be understood that within the scope of the appended claims, the invention may be practiced otherwise than as specifically described herein.

TABLE 22

| | PVA | PVA concentration[1] (ppm) | PVA biodegradability[2] (%) |
|---|---|---|---|
| Example 101 | PVA-1 | 4.1 | 99.4 |
| 102 | PVA-2 | 2.8 | 99.6 |
| 103 | PVA-7 | 0.9 | 99.9 |
| 104 | PVA-12 | 19 | 97.3 |
| 105 | PVA-13 | 1.7 | 99.8 |
| 106 | PVA-15 | 2.3 | 99.7 |
| 107 | PVA-16 | 10 | 98.6 |
| 108 | PVA-18 | 5.6 | 99.2 |
| 109 | PVA-28 | 8.4 | 98.8 |
| Comparative Example 89 | PVA-30 | 190 | 72.9 |
| 90 | PVA-32 | 145 | 79.3 |
| 91 | PVA-35 | 160 | 77.1 |
| 92 | PVA-45 | 41 | 94.1 |
| 93 | PVA-46 | 53 | 92.4 |
| 94 | PVA-49 | 45 | 93.6 |

[1]The concentration of PVA in sludge liquid after 3-day continuous activated sludge treatment.
[2]The biodegradability of PVA after 3-day continuous activated sludge treatment.

What is claimed is:

1. A vinyl alcohol polymer having
   an ethylene unit content of 2 to 19 mole %;
   a polymerization degree of 200 to 2,000;
   a degree of saponification of 80 to 99.99 mole %;
   a total content of carboxyl group and lactone rings of 0.02 to 0.4 mole %;
   a 1,2-glycol bond content of 1.2 to 2 mole %;
   a molar fraction, based on vinyl alcohol units, of a hydroxyl group of vinyl alcohol unit located at the center of 3 successive vinyl alcohol unit chain in terms of triad expression of 65 to 98 mole %; and
   a melting point of 160 to 230° C.

2. The vinyl alcohol polymer according to claim 1, wherein the total content of carboxyl group and lactone rings satisfies the following formula (1):

$$-1.94\times 10^{-5}\times P+0.044 \leqq \text{content} \leqq -1.39\times 10^{-4}\times P+0.42 \quad (1)$$

wherein said content is expressed in mol % and represents the total content of carboxyl group and lactone rings, and P represents the viscosity average degree of polymerization of the vinyl alcohol polymer.

3. The vinyl alcohol polymer according to claim 1, wherein the molar fraction, based on vinyl alcohol units, of a hydroxyl group of vinyl alcohol unit located at the center of 3 successive vinyl alcohol unit chain in terms of triad expression satisfies the following formula (2)

$$-1.5\times Et+100 \geqq \text{molar fraction} \geqq -Et+85 \quad (2)$$

wherein said molar fraction represents the molar fraction in mole % based on vinyl alcohol units of the hydroxyl group of vinyl alcohol unit located at the center of 3 successive vinyl alcohol unit chain in terms of triad expression; and wherein said Et represents the ethylene unit content in mole % of the vinyl alcohol polymer.

4. A vinyl alcohol polymer composition comprising a vinyl alcohol polymer (A) according to claim 1 and an alkali metal (B) in an amount in terms of sodium of 0.003 to 1 part by weight based on 100 parts by weight of the vinyl alcohol polymer (A).

5. The vinyl alcohol polymer according to claim 1, wherein the ethylene unit content is 2.5 to 17 mole %.

6. The vinyl alcohol polymer according to claim 5, wherein the ethylene unit content is 3 to 15 mole %.

7. The vinyl alcohol polymer according to claim 6, wherein the ethylene unit content is 3.5 to 13 mole %.

8. The vinyl alcohol polymer according to claim 1, wherein the polymerization degree is 220 to 1,800.

9. The vinyl alcohol polymer according to claim 8, wherein the polymerization degree is 240 to 1,600.

10. The vinyl alcohol polymer according to claim 9, wherein the polymerization degree is 250 to 1,500.

11. The vinyl alcohol polymer according to claim 1, wherein the degree of saponification is 84 to 99.9 mole %.

12. The vinyl alcohol polymer according to claim 11, wherein the degree of saponification is 87 to 99.7 mole %.

13. The vinyl alcohol polymer according to claim 1, wherein the degree of saponification is 90 to 99.5 mole %.

14. The vinyl alcohol polymer according to claim 1, wherein the total content of carboxyl group and lactone rings is 0.022 to 0.37 mole %.

15. The vinyl alcohol polymer according to claim 14, wherein the total content of carboxyl group and lactone rings is 0.024 to 0.33 mole %.

16. The vinyl alcohol polymer according to claim 15, wherein the total content of carboxyl group and lactone rings is 0.025 to 0.3 mole %.

* * * * *